US012688973B2

(12) United States Patent
Hirai

(10) Patent No.: US 12,688,973 B2
(45) Date of Patent: Jul. 21, 2026

(54) MULTILAYER CERAMIC CAPACITOR

(71) Applicant: Murata Manufacturing Co., Ltd., Nagaokakyo (JP)

(72) Inventor: Tomoaki Hirai, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 165 days.

(21) Appl. No.: 18/802,103

(22) Filed: Aug. 13, 2024

(65) Prior Publication Data
US 2024/0404760 A1 Dec. 5, 2024

Related U.S. Application Data

(63) Continuation of application No. PCT/JP2023/008535, filed on Mar. 7, 2023.

(30) Foreign Application Priority Data

Jun. 16, 2022 (JP) ................................. 2022-097587

(51) Int. Cl.
| | |
|---|---|
| *H01G 4/30* | (2006.01) |
| *H01G 4/008* | (2006.01) |
| *H01G 4/012* | (2006.01) |
| *H01G 4/12* | (2006.01) |

(52) U.S. Cl.
CPC ............... *H01G 4/30* (2013.01); *H01G 4/008* (2013.01); *H01G 4/012* (2013.01); *H01G 4/1227* (2013.01)

(58) Field of Classification Search
CPC .......... H01G 4/30; H01G 4/008; H01G 4/012; H01G 4/1227
See application file for complete search history.

(56) References Cited

U.S. PATENT DOCUMENTS

| | | | | |
|---|---|---|---|---|
| 9,245,689 | B2 * | 1/2016 | Lee | ......................... H01G 4/005 |
| 11,114,246 | B2 * | 9/2021 | Iguchi | ...................... H01G 4/30 |
| 2013/0027842 | A1 | 1/2013 | Kim et al. | |
| 2022/0406527 | A1 * | 12/2022 | Hirai | ......................... H01G 4/30 |
| 2022/0406528 | A1 * | 12/2022 | Hirai | ...................... H01G 4/232 |

(Continued)

FOREIGN PATENT DOCUMENTS

| | | |
|---|---|---|
| JP | 2000133545 A | 5/2000 |
| JP | 2002075771 A | 3/2002 |

(Continued)

OTHER PUBLICATIONS

International Search Report in PCT/JP2023/008535, mailed May 30, 2023, 2 pages.

(Continued)

*Primary Examiner* — Timothy J. Dole
(74) *Attorney, Agent, or Firm* — Keating & Bennett, LLP

(57) ABSTRACT

A multilayer ceramic capacitor includes a multilayer body including a dielectric layers and internal electrode layers laminated on each other, and first and second external electrodes. The internal electrode layers include first and second internal electrode layers each respectively electrically connected to the first and second external electrodes. The first and second internal electrode layers include holes with different area equivalent diameters. A thickness of each of the dielectric layers is about 0.6 μm or less and (area equivalent diameter D99)<about $0.1468 \times \exp(6.7622 \times t)$ is satisfied.

16 Claims, 14 Drawing Sheets

(56) References Cited

U.S. PATENT DOCUMENTS

| | | | | |
|---|---|---|---|---|
| 2022/0415574 A1* | 12/2022 | Atsumi | ................. | H01G 4/012 |
| 2023/0162916 A1* | 5/2023 | Hirai | ..................... | H01G 4/005 |
| | | | | 361/301.4 |
| 2024/0404752 A1* | 12/2024 | Hirai | ................... | H01G 4/0085 |
| 2024/0404760 A1* | 12/2024 | Hirai | ....................... | H01G 4/30 |

FOREIGN PATENT DOCUMENTS

| | | | |
|---|---|---|---|
| JP | 2013030753 A | 2/2013 |
| JP | 2018046086 A | 3/2018 |
| JP | 2019114753 A | 7/2019 |

OTHER PUBLICATIONS

Written Opinion in PCT/JP2023/008535, mailed May 30, 2023, 3 pages.

* cited by examiner

AREA EQUIVALENT DIAMETER OF HOLES OF INTERNAL ELECTRODE LAYER($\mu$ m)

MULTILAYER CERAMIC CAPACITOR

CROSS REFERENCE TO RELATED APPLICATIONS

This application claims the benefit of priority to Japanese Patent Application No. 2022-097587 filed on Jun. 16, 2022 and is a Continuation Application of PCT Application No. PCT/JP2023/008535 filed on Mar. 7, 2023. The entire contents of each application are hereby incorporated herein by reference.

BACKGROUND OF THE INVENTION

1. Field of the Invention

The present invention relates to multilayer ceramic capacitors.

2. Description of the Related Art

Conventionally, multilayer ceramic capacitors have been known. In general, multilayer ceramic capacitors each include a multilayer body including dielectric layers and internal electrode layers which are alternately laminated therein. In each of such multilayer ceramic capacitors, a further reduction in size, an increase in capacitance, and an improvement in reliability are required. Therefore, attempts have been made to reduce the thickness of each of the dielectric layers, to reduce the thickness of each of the internal electrode layers, and to increase the number of laminated layers of these layers.

However, when the thickness of each of the dielectric layers is reduced, the electric field strength applied to one layer relatively increases, and the reliability at the time of voltage application is reduced. For example, Japanese Unexamined Patent Application, Publication No. 2000-133545 discloses that, when thin dielectric layers are used for high voltage, dielectric breakdown may occur due to electric field concentration. Japanese Unexamined Patent Application, Publication No. 2000-133545 also discloses that providing a plurality of auxiliary electrodes makes it possible to achieve a high breakdown voltage in each of the multilayer ceramic capacitors. However, since the multilayer ceramic capacitors disclosed in Japanese Unexamined Patent Application, Publication No. 2000-133545 include a plurality of auxiliary electrodes, it is difficult to maintain the area of the capacitor active portion that generates capacitance. Therefore, it is difficult to reduce or prevent electric field concentration, while reducing or preventing a decrease in capacitance.

SUMMARY OF THE INVENTION

Example embodiments of the present invention provide multilayer ceramic capacitors that are each able to reduce or prevent electric field concentration at the time of voltage application, while reducing or preventing a decrease in capacitance by providing thin dielectric layers each sandwiched by a plurality of internal electrode layers.

An example embodiment of the present invention provides a multilayer ceramic capacitor that includes a multilayer body including a plurality of dielectric layers that are laminated, a plurality of internal electrode layers each laminated on a corresponding one of the plurality of dielectric layers, a first main surface and a second main surface opposed to each other in a height direction, a first lateral surface and a second lateral surface opposed to each other in a width direction orthogonal or substantially orthogonal to the height direction, and a first end surface and a second end surface opposed to each other in a length direction orthogonal or substantially orthogonal to the height direction and the width direction, and a first external electrode and a second external electrode, in which the plurality of internal electrodes include a plurality of first internal electrodes each electrically connected to the first external electrode and a plurality of second internal electrode layers each electrically connected to the second external electrode, the plurality of first internal electrode layers and the plurality of second internal electrode layers each include a plurality of holes with different area equivalent diameters, when an area equivalent diameter at which a cumulative value in a cumulative distribution of the area equivalent diameters of the plurality of holes is about 99% is defined as an area equivalent diameter D99, and a thickness of each of the plurality of dielectric layers sandwiched between a corresponding one of the plurality of first internal electrode layers and a corresponding one of the plurality of second internal electrode layers is defined as a thickness t, the thickness t of each of the plurality of dielectric layers is about 0.6 $\mu$m or less and (area equivalent diameter D99)<about 0.1468×exp (6.7622×t) is satisfied.

According to example embodiments of the present invention, it is possible to provide multilayer ceramic capacitors that are each able to reduce or prevent electric field concentration at the time of voltage application, while reducing or preventing a decrease in capacitance by providing thin dielectric layers each sandwiched by a plurality of internal electrode layers.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Example embodiments of the present invention will be described in detail below with reference to the drawings.

Figure 1:
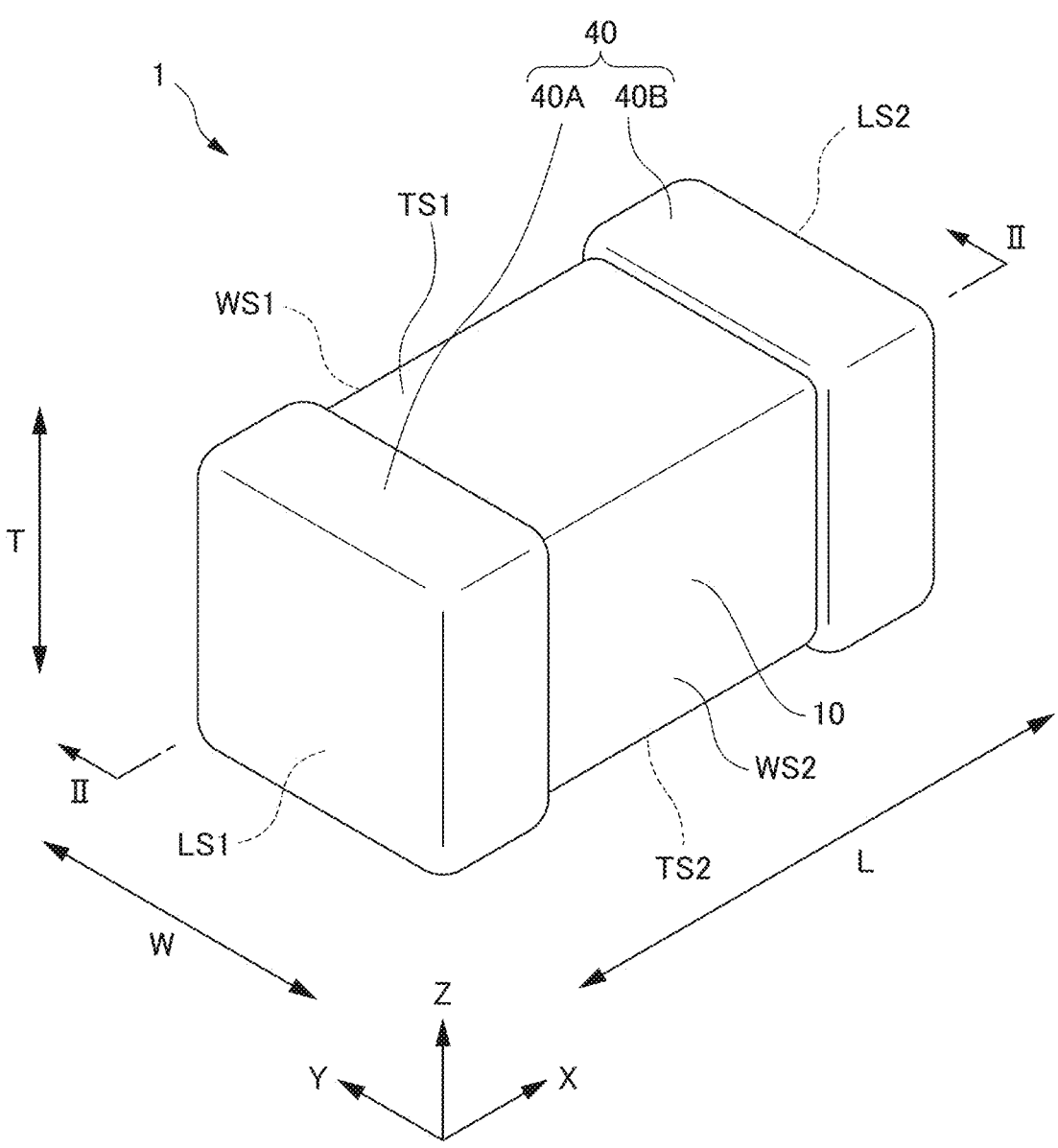
FIG. 1 is an external perspective view of a multilayer ceramic capacitor according to an example embodiment of the present invention.
Figure 2:
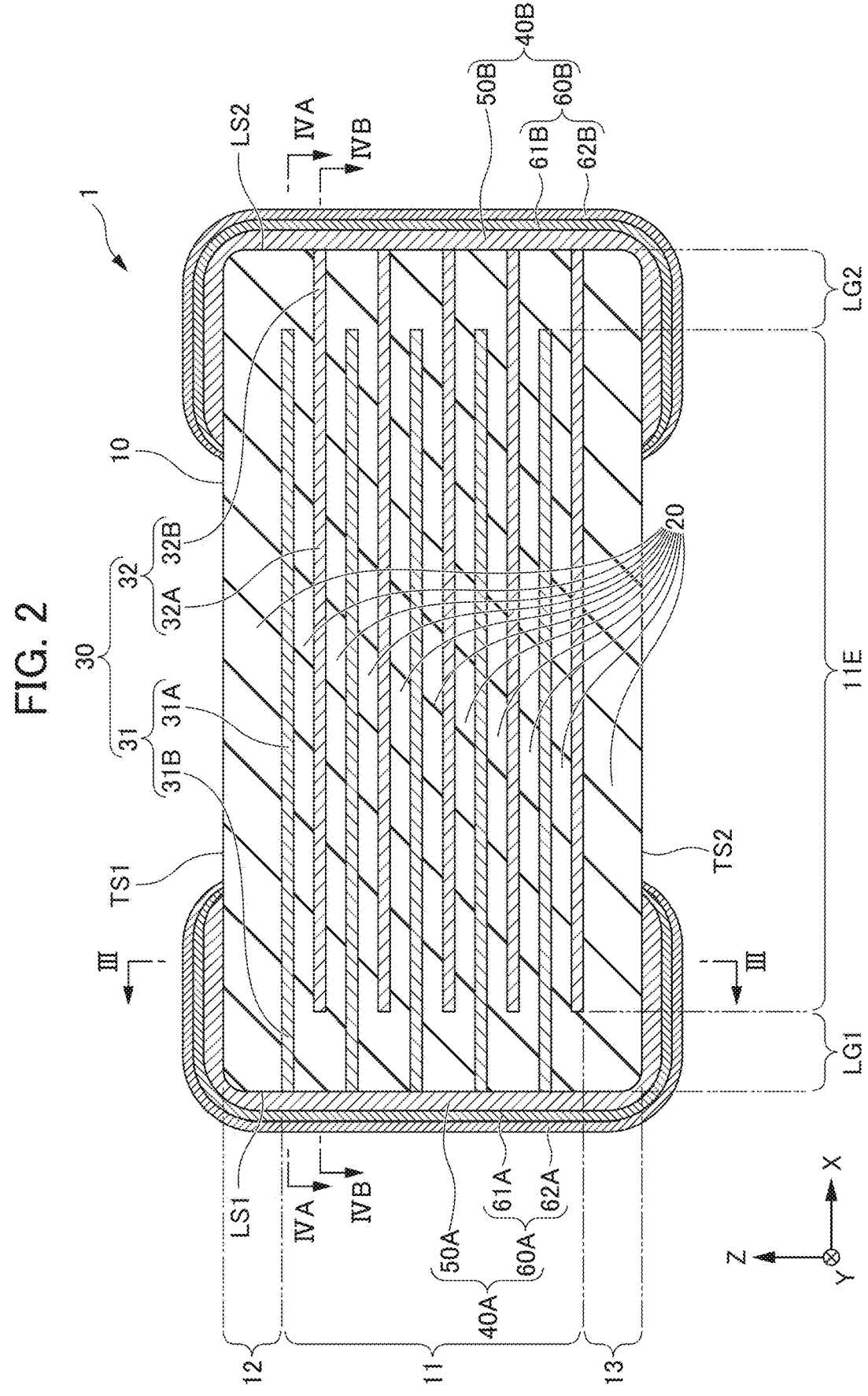
FIG. 2 is a cross-sectional view taken along the line II-II of the multilayer ceramic capacitor shown in FIG. 1.
Figure 3:
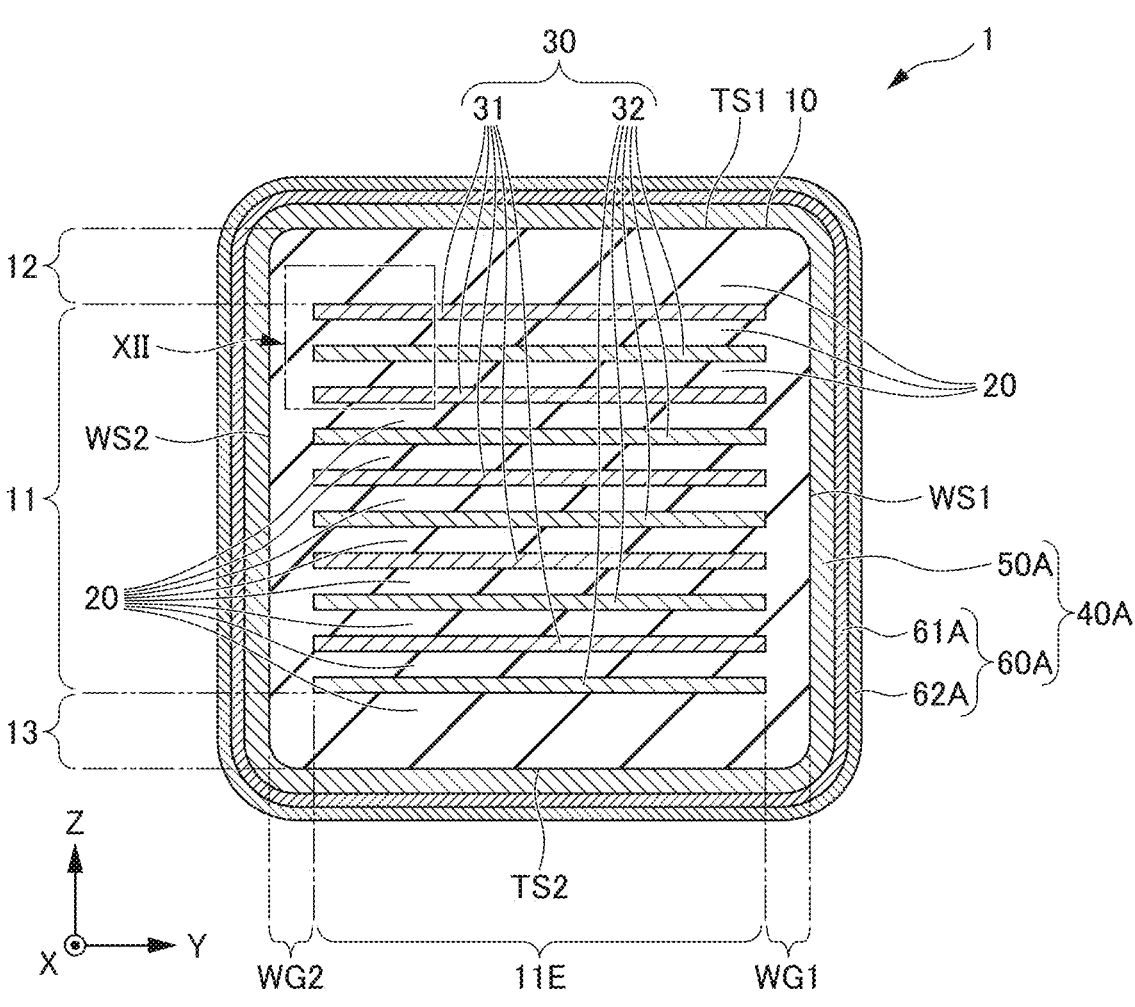
FIG. 3 is a cross-sectional view taken along the line III-III of the multilayer ceramic capacitor shown in FIG. 2.
Figure 4A:
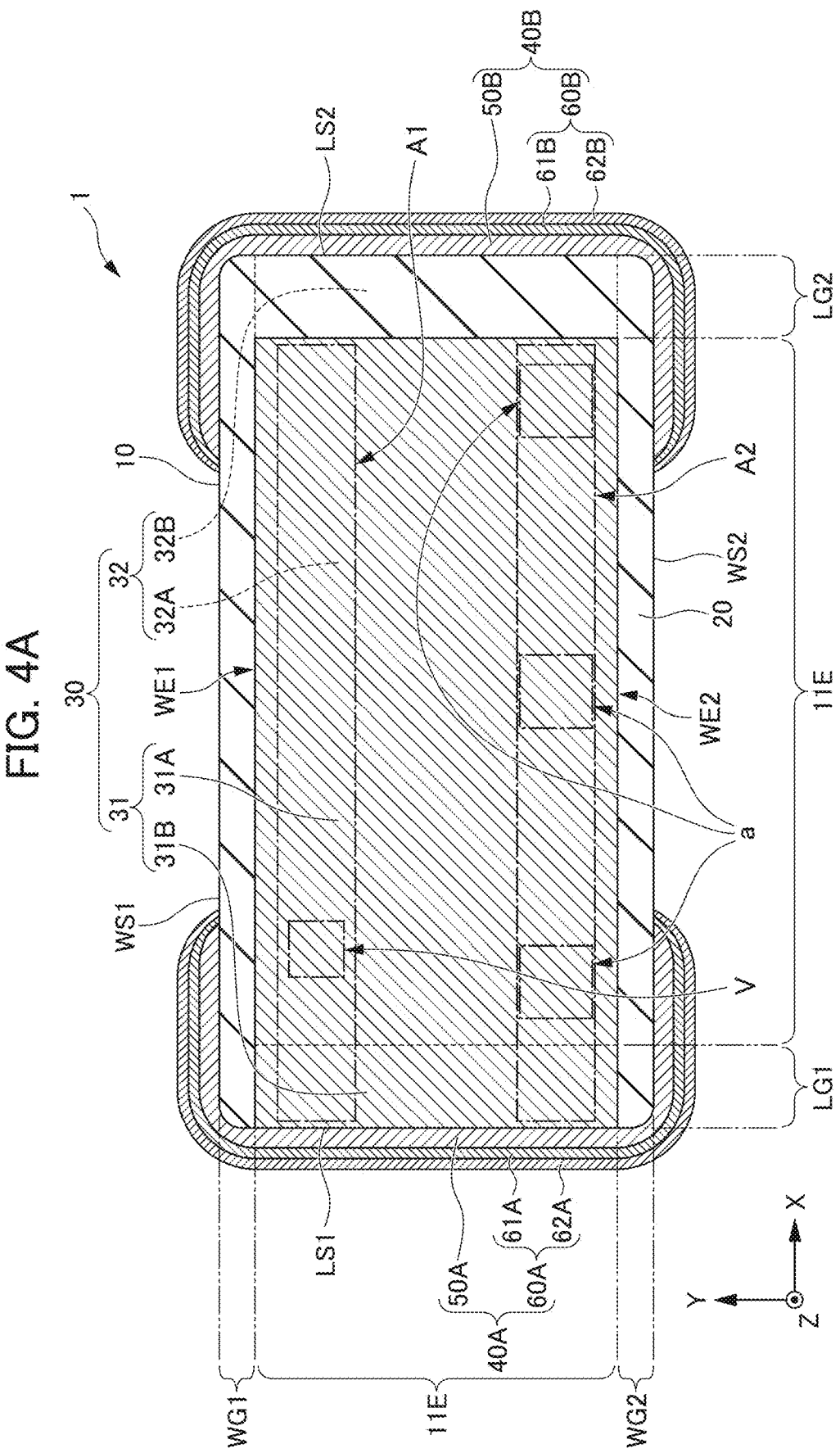
FIG. 4A is a cross-sectional view taken along the line IVA-IVA of the multilayer ceramic capacitor shown in FIG. 2.
Figure 4B:
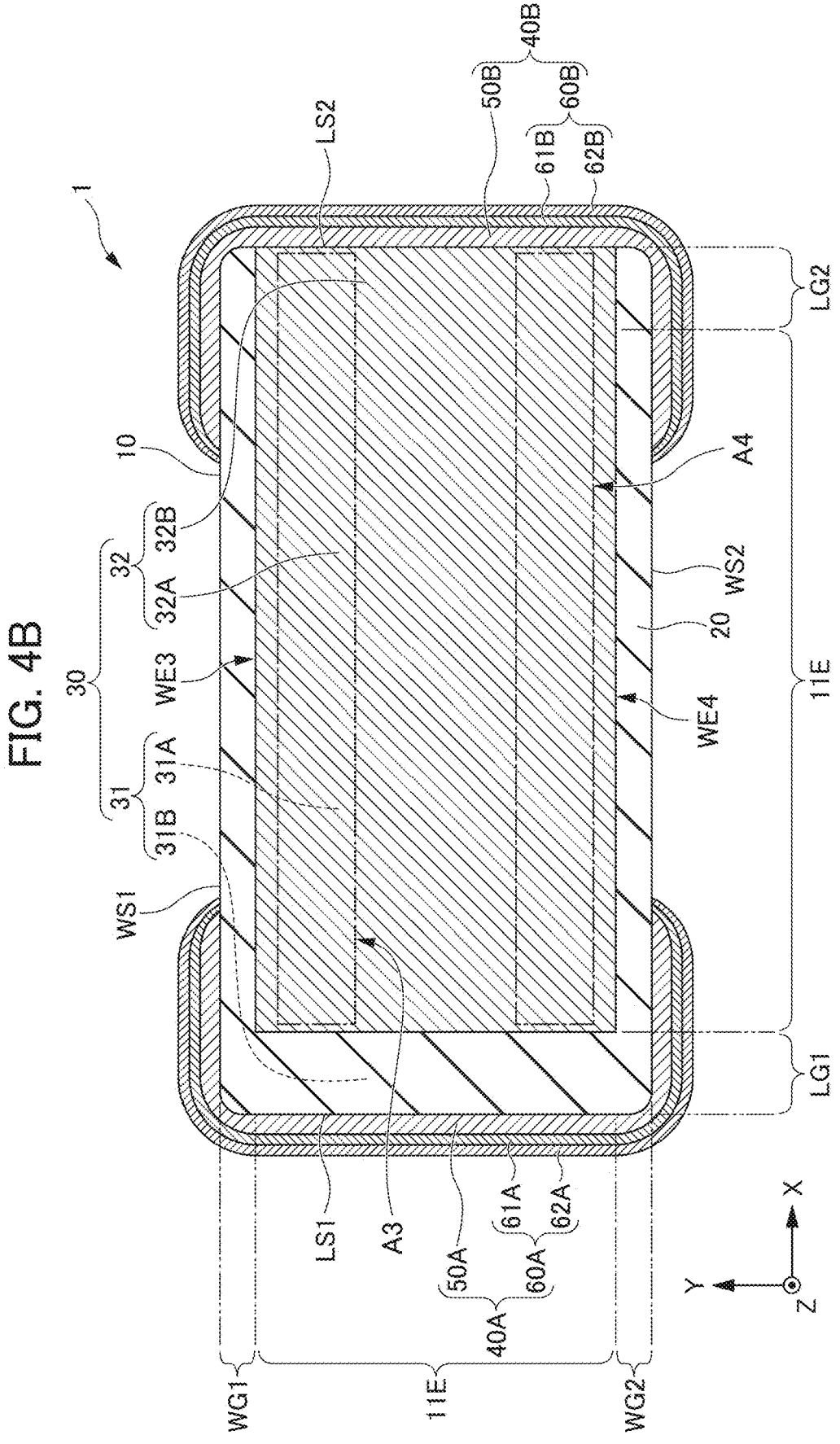
FIG. 4B is a cross-sectional view taken along the line IVB-IVB of the multilayer ceramic capacitor shown in FIG. 2.

Hereinafter, a multilayer ceramic capacitor 1 according to an example embodiment of the present invention will be described. FIG. 1 is an external perspective view of a multilayer ceramic capacitor 1 according to the present example embodiment. FIG. 2 is a cross-sectional view taken along the line II-II of the multilayer ceramic capacitor 1 shown in FIG. 1. FIG. 3 is a cross-sectional view taken along the line III-III of the multilayer ceramic capacitor 1 shown in FIG. 2. FIG. 4A is a cross-sectional view taken along the line IVA-IVA of the multilayer ceramic capacitor 1 shown in FIG. 2. FIG. 4B is a cross-sectional view taken along the line IVB-IVB of the multilayer ceramic capacitor 1 shown in FIG. 2.

The multilayer ceramic capacitor 1 includes a multilayer body 10 and external electrodes 40.

The XYZ Cartesian coordinate system is shown in FIGS. 1 to 4B. A length direction L of the multilayer ceramic capacitor 1 and the multilayer body 10 corresponds to the X direction. A width direction W of the multilayer ceramic capacitor 1 and the multilayer body 10 corresponds to the Y direction. A height direction T of the multilayer ceramic capacitor 1 and the multilayer body 10 corresponds to the Z direction. Here, the cross section shown in FIG. 2 is also referred to as an LT cross section. The cross section shown in FIG. 3 is also referred to as a WT cross section. The cross section shown in FIGS. 4A and 4B is also referred to as an LW cross section.

As shown in FIGS. 1 to 4B, the multilayer body 10 includes a first main surface TS1 and a second main surface TS2 opposed to each other in the height direction T, a first lateral surface WS1 and a second lateral surface WS2 opposed to each other in the width direction W orthogonal or substantially orthogonal to the height direction T, and a first end surface LS1 and a second end surface LS2 opposed to each other in the length direction L orthogonal or substantially orthogonal to the height direction T and the width direction W.

As shown in FIG. 1, the multilayer body 10 has a rectangular or substantially rectangular parallelepiped shape. The dimension of the multilayer body 10 in the length direction L is not necessarily longer than the dimension of the width direction W. Corner portions and ridge portions of the multilayer body 10 are preferably rounded. The corner portions are portion where the three surfaces of the multilayer body intersect, and the ridge portions are portions where the two surfaces of the multilayer body intersect. In addition, unevenness or the like may be provided on a portion or the entirety of the surface of the multilayer body 10.

The dimension of the multilayer body 10 is not particularly limited. However, when the dimension in the length direction L of the multilayer body 10 is defined as an L dimension, the L dimension is preferably about 0.2 mm or more and about 6 mm or less, for example. Furthermore, when the dimension in the height direction T of the multilayer body 10 is defined as a T dimension, the T dimension is preferably about 0.05 mm or more and about 5 mm or less, for example. Furthermore, when the dimension in the width direction W of the multilayer body 10 is defined as a W dimension, the W dimension is preferably about 0.1 mm or more and about 5 mm or less, for example.

As shown in FIGS. 2 and 3, the multilayer body 10 includes an inner layer portion 11, and a first main surface-side outer layer portion 12 and a second main surface-side outer layer portion 13 that sandwich the inner layer portion 11 in the height direction T.

The inner layer portion 11 includes a plurality of dielectric layers 20 and a plurality of internal electrode layers 30. The inner layer portion 11 includes the internal electrode layers 30, in the height direction T, from the internal electrode layer 30 located closest to the first main surface TS1 to the internal electrode layer 30 located closest to the second main surface TS2. In the inner layer portion 11, the plurality of internal electrode layers 30 are opposed to each other with a corresponding one of the dielectric layers 20 interposed therebetween. The inner layer portion 11 generates a capacitance and substantially defines and functions as a capacitor.

The plurality of dielectric layers 20 are each made of a dielectric material. The dielectric material may be a dielectric ceramic including a component such as, for example, $BaTiO_3$, $CaTiO_3$, $SrTiO_3$, or $CaZrO_3$. Furthermore, the dielectric material may be obtained by adding a secondary component such as, for example, a Mn compound, an Fe compound, a Cr compound, a Co compound, or a Ni compound to the main component. The dielectric material particularly preferably includes $BaTiO_3$ as a main component, for example.

The thicknesses of the dielectric layers 20 are preferably about 0.6 μm or less, for example. The number of the dielectric layers 20 to be laminated (stacked) is preferably fifteen or more and 1200 or less, for example. The number of the dielectric layers 20 refers to the total number of dielectric layers in the inner layer portion 11, and dielectric layers in the first main surface-side outer layer portion 12 and the second main surface-side outer layer portion 13.

The plurality of internal electrode layers 30 include a plurality of first internal electrode layers 31 and a plurality of second internal electrode layers 32. The plurality of first internal electrode layers 31 are each provided on the dielectric layer 20. The plurality of second internal electrode layers 32 are each provided on the dielectric layer 20. The plurality of first internal electrode layers 31 and the plurality of second internal electrode layers 32 are alternately provided in the height direction T of the multilayer body 10 with a corresponding one of the dielectric layers 20 interposed therebetween. The first internal electrode layers 31 and the second internal electrode layers 32 sandwich the dielectric layers 20.

The first internal electrode layers 31 each include a first counter portion 31A which is opposed to the second internal electrode layer 32, and a first extension portion 31B extending from the first counter portion 31A toward the first end surface LS1. The first extension portion 31B is exposed at the first end surface LS1.

The second internal electrode layers 32 each include a second counter portion 32A which is opposed to the first internal electrode layer 31, and a second extension portion 32B extending from the second counter portion 32A toward the second end surface LS2. The second extension portion 32B is exposed at the second end surface LS2.

In the present example embodiment, the first counter portion 31A and the second counter portion 32A are opposed to each other with the dielectric layer 20 interposed therebetween, such that a capacitance is generated, and the characteristics of a capacitor are provided.

The shapes of the first counter portion 31A and the second counter portion 32A are not particularly limited. However, they are preferably rectangular or substantially rectangular. However, the corner portions of the rectangular shape may be rounded, or the corner portions of the rectangular or substantially rectangular shape may be provided obliquely. The shapes of the first extension portion 31B and the second extension portion 32B are not particularly limited. However, they are preferably rectangular or substantially rectangular. However, the corner portions of the rectangular or substantially rectangular shape may be rounded, or the corner portions of the rectangular or substantially rectangular shape may be provided obliquely.

The dimension in the width direction W of the first counter portion 31A may be the same or substantially same as the dimension in the width direction W of the first extension portion 31B, or either of them may be smaller. The dimension in the width direction W of the second counter portion 32A may be the same or substantially same as the dimension in the width direction W of the second extension portion 32B, or either of them may be smaller.

As shown in FIG. 4A, each of the first internal electrode layers 31 includes a first side WE1 in the vicinity of the first lateral surface WS1, and a second side WE2 in the vicinity of the second side WS2. As shown in FIG. 4B, each of the second internal electrode layers 32 includes a third side WE3 in the vicinity of the first lateral surface WS1 and a fourth side WE4 in the vicinity of the second lateral surface WS2.

The first internal electrode layers 31 and the second internal electrode layers 32 are each made of an appropriate electrically conductive material including a metal such as, for example, Ni, Cu, Ag, Pd, or Au, or an alloy including at least one of these metals. When using an alloy, the first internal electrode layers 31 and the second internal electrode layers 32 may be made of, for example, a Ag—Pd alloy or the like.

The thickness of each of the first internal electrode layers 31 and the second internal electrode layers 32 is preferably, for example, about 0.2 µm or more and 2.0 µm or less. The total number of the first internal electrode layers 31 and the second internal electrode layers 32 is preferably fifteen or more and 1000 or less, for example. In addition, the first internal electrode layers 31 and the second internal electrode layers 32 may be thicker than the dielectric layers 20.

The first main surface-side outer layer portion 12 is located in the vicinity of the first main surface TS1 of the multilayer body 10. The first main surface-side outer layer portion 12 is an assembly of a plurality of dielectric layers 20 located between the first main surface TS1 and the internal electrode layer 30 closest to the first main surface TS1. The dielectric layers 20 used in the first main surface-side outer layer portion 12 may be the same or substantially same as the dielectric layers 20 used in the inner layer portion 11.

The second main surface-side outer layer portion 13 is located in the vicinity of the second main surface TS2 of the multilayer body 10. The second main surface-side outer layer portion 13 is an assembly of a plurality of dielectric layers 20 located between the second main surface TS2 and the internal electrode layer 30 closest to the second main surface TS2. The dielectric layers 20 used in the second main surface-side outer layer portion 13 may be the same or substantially same as the dielectric layers 20 used in the inner layer portion 11.

As described above, the multilayer body 10 includes the plurality of laminated dielectric layers 20 and the plurality of laminated internal electrode layers 30 on the dielectric layers. In other words, the multilayer ceramic capacitor 1 includes the multilayer body 10 including the dielectric layers 20 and the internal electrode layers 30 which are alternately laminated therein.

In addition, the multilayer body 10 includes a counter electrode portion 11E. The counter electrode portion 11E refers to a portion where the first counter portion 31A of the first internal electrode layer 31 and the second counter portion 32A of the second internal electrode layer 32 are opposed to each other. The counter electrode portion 11E defines and functions as a portion of the inner layer portion 11. FIGS. 4A and 4B each show the range of the counter electrode portion 11E in the width direction W and in the length direction L. The counter electrode portion 11E is also referred to as a capacitor active portion.

The multilayer body 10 includes lateral surface-side outer layer portions. The lateral surface-side outer layer portions include a first lateral surface-side outer layer portion WG1 and a second lateral surface-side outer layer portion WG2. The first lateral surface-side outer layer portion WG1 is a portion including the dielectric layer 20 located between the counter electrode portion 11E and the first lateral surface WS1. The second lateral surface-side outer layer portion WG2 is a portion including the dielectric layer 20 located between the counter electrode portion 11E and the second lateral surface WS2. FIGS. 3, 4A, and 4B each show the ranges of the first lateral surface-side outer layer portion WG1 and the second lateral surface-side outer layer portion WG2 in the width direction W. The lateral surface-side outer layer portions are also each referred to as a W gap or a side gap.

The multilayer body 10 includes end surface-side outer layer portions. The end surface-side outer layer portions include a first end surface-side outer layer portion LG1 and a second end surface-side outer layer portion LG2. The first end surface-side outer layer portion LG1 is a portion including the dielectric layer 20 located between the counter electrode portion 11E and the first end surface LS1. The second end surface-side outer layer portion LG2 is a portion including the dielectric layer 20 located between the counter electrode portion 11E and the second end surface LS2. FIGS. 2, 4A, and 4B each show the ranges in the length directions L of the first end surface-side outer layer portion LG1 and the second end surface-side outer layer portion LG2. The end surface-side outer layer portion is also each referred to as an L gap or an end gap.

The external electrodes 40 include a first external electrode 40A provided in the vicinity of the first end surface LS1 and a second external electrode 40B provided in the vicinity of the second end surface LS2.

The first external electrode 40A is provided on the first end surface LS1. The first external electrode 40A is connected to the first internal electrode layers 31. The first external electrode 40A may be provided on a portion of the first main surface TS1 and a portion of the second main surface TS2, and also on a portion of the first lateral surface WS1 and a portion of the second lateral surface WS2. In the present example embodiment, the first external electrode 40A extends from the first end surface LS1 to a portion of the first main surface TS1 and to a portion of the second main surface TS2, and to a portion of the first lateral surface WS1 and to a portion of the second lateral surface WS2.

The second external electrode 40B is provided on the second end surface LS2. The second external electrode 40B is connected to the second internal electrode layers 32. The second external electrodes 40B may be provided on a portion of the first main surface TS1 and a portion of the second main surface TS2, and also on a portion of the first lateral surface WS1 and a portion of the second lateral surface WS2. In the present example embodiment, the second external electrode 40B extends from the second end surface LS2 to a portion of the first main surface TS1 and to a portion of the second main surface TS2, and to a portion of the first lateral surface WS1 and a portion of the second lateral surface WS2.

As described above, in the multilayer body 10, the capacitance is generated by the first counter portions 31A of the first internal electrode layers 31 and the second counter portions 32A of the second internal electrode layers 32 opposing each other with the dielectric layers 20 interposed therebetween. Therefore, characteristics of the capacitor are provided between the first external electrode 40A to which the first internal electrode layers 31 are connected and the second external electrode 40B to which the second internal electrode layers 32 are connected.

The first external electrode 40A includes a first base electrode layer 50A and a first plated layer 60A provided on the first base electrode layer 50A.

The second external electrode 40B includes a second base electrode layer 50B and a second plated layer 60B provided on the second base electrode layer 50B.

The first base electrode layer 50A is provided on the first end surface LS1. The first base electrode layer 50A is connected to the first internal electrode layers 31. In the present example embodiment, the first base electrode layer 50A extends from the first end surface LS1 to a portion of the first main surface TS1 and to a portion of the second main surface TS2, and to a portion of the first lateral surface WS1 and to a portion of the second lateral surface WS2.

The second base electrode layer 50B is provided on the second end surface LS2. The second base electrode layer 50B is connected to the second internal electrode layers 32. In the present example embodiment, the second base electrode layer 50B extends from the second end surface LS2 to a portion of the first main surface TS1 and to a portion of the second main surface TS2, and to a portion of the first lateral surface WS1 and to a portion of the second lateral surface WS2.

The first base electrode layer 50A and the second base electrode layer 50B of the present example embodiment are fired layers. It is preferable that the fired layers each include both a metal component, and either a glass component or a ceramic component, or both the glass component and the ceramic component. The metal component includes, for example, at least one of Cu, Ni, Ag, Pd, Ag—Pd alloys, Au, or the like. The glass component includes, for example, at least one of B, Si, Ba, Mg, Al, Li, or the like. As the ceramic component, the same or substantially same ceramic material as that of the dielectric layer 20 may be used, or a different ceramic material may be used. Ceramic components include, for example, at least one of $BaTiO_3$, $CaTiO_3$, $(Ba,Ca)TiO_3$, $SrTiO_3$, $CaZrO_3$, or the like.

The fired layer is obtained by, for example, applying an electrically conductive paste including glass and metal to a multilayer body and firing it. The fired layer may be obtained by simultaneously firing a multilayer chip including the internal electrodes and the dielectric layers and an electrically conductive paste applied to the multilayer chip, or obtained by firing the multilayer chip including the internal electrodes and the dielectric layers to obtain a multilayer body, following which the multilayer body is coated with an electrically conductive paste, and subjected to firing. In a case of simultaneously firing the multilayer chip including the internal electrodes and the dielectric layers, it is preferable that the fired layer is formed by firing a material to which a ceramic material instead of glass component is added. In this case, it is particularly preferable to use, as the ceramic material to be added, the same or substantially same type of ceramic material as the dielectric layer 20. Furthermore, the fired layer may include a plurality of layers.

The thickness in the length direction of the first base electrode layer 50A located in the vicinity of the first end surface LS1 is preferably, for example, about 3 μm or more and about 200 μm or less at a middle portion in the height direction T and the width direction W of the first base electrode layer 50A.

The thickness in the length direction of the second base electrode layer 50B located in the vicinity of the second end surface LS2 is preferably, for example, about 3 μm or more and about 200 μm or less at a middle portion of the height direction T and the width direction W of the second base electrode layer 50B.

When providing the first base electrode layer 50A to at least one of portions of the first main surface TS1 and the second main surface TS2, the thickness in the height direction of the first base electrode layer 50A provided at this portion is preferably about 3 μm or more and about 25 μm or less at a middle portion in the length direction L and the width direction W of the first base electrode layer 50A provided at this portion, for example.

When providing the first base electrode layer 50A to at least one of portions of the first lateral surface WS1 and the second lateral surface WS2, the thickness in the width direction of the first base electrode layer 50A provided at this portion is preferably about 3 μm or more and about 25 μm or less at a middle portion in the length direction L and the height direction T of the first base electrode layer 50A provided at this portion, for example.

When providing the second base electrode layer 50B to at least one of portions of the first main surface TS1 and the second main surface TS2, the thickness in the height direction of the second base electrode layer 50B provided at this portion is preferably about 3 μm or more and about 25 μm or less at a middle portion in the length direction L and the width direction W of the second base electrode layer 50B provided at this portion, for example.

When providing the second base electrode layer 50B to at least one of portions of the first lateral surface WS1 and the second lateral surface WS2, the thickness in the width direction of the second base electrode layer 50B provided at this portion is preferably about 3 μm or more and about 25 μm or less at a middle portion in the length direction L and the height direction T of the second base electrode layer 50B provided at this portion, for example.

The first base electrode layer 50A and the second base electrode layer 50B are not limited to the fired layers. The first base electrode layer 50A and the second base electrode layer 50B may include at least one of a fired layer, an electrically conductive resin layer, a thin film layer, or other layers. For example, the first base electrode layer 50A and the second base electrode layer 50B each may be a thin film layer. The thin film layer may be formed by a thin film forming method such as a sputtering method or a deposition method, for example. The thin film layer may be a layer of, for example, about 10 μm or less on which metal particles are deposited.

The first plated layer 60A covers the first base electrode layer 50A.

The second plated layer 60B covers the second base electrode layer 50B.

The first plated layer 60A and the second plated layer 60B may each include, for example, at least one of Cu, Ni, Sn, Ag, Pd, a Ag—Pd alloy, Au, and the like. The first plated layer 60A and the second plated layer 60B may each include a plurality of layers. The first plated layer 60A and the second plated layer 60B each preferably include a two-layer structure including a Sn plated layer on a Ni plated layer, for example.

The first plated layer 60A covers the first base electrode layer 50A. In the present example embodiment, for example, the first plated layer 60A includes a first Ni plated layer 61A, and a first Sn plated layer 62A provided on the first Ni plated layer 61A.

The second plated layer 60B covers the second base electrode layer 50B. In the present example embodiment, for example, the second plated layer 60B includes a second Ni plated layer 61B, and a second Sn plated layer 62B provided on the second Ni plated layer 61B.

The Ni plated layer prevents the first base electrode layer 50A and the second base electrode layer 50B from being eroded by solder when mounting the multilayer ceramic capacitor 1. Furthermore, the Sn plated layer improves the wettability of the solder when mounting the multilayer ceramic capacitor 1. This facilitates the mounting of the multilayer ceramic capacitor 1. The thickness of each of the first Ni plated layer 61A, the first Sn plated layer 62A, the second Ni plated layer 61B, and the second Sn plated layer 62B is preferably about 2 μm or more and about 10 μm or less, for example.

The first external electrode 40A and the second external electrode 40B of the present example embodiment may each include an electrically conductive resin layer including electrically conductive particles and a thermosetting resin, for example. When the electrically conductive resin layer is provided as the first base electrode layer 50A and the second base electrode layer 50B, the electrically conductive resin layer may cover the fired layer, or may be provided directly on the multilayer body 10 without providing the fired layer. If the electrically conductive resin layer covers the fired layer, the electrically conductive resin layer is disposed between the fired layer and the plated layer, or between the first plated layer 60A and the second plated layer 60B. The electrically conductive resin layer may completely cover the fired layer or may cover a portion of the fired layer.

The electrically conductive resin layer including a thermosetting resin is more flexible than an electrically conductive layer made of, for example, a plated film or a fired product of an electrically conductive paste. Therefore, even when an impact caused by physical shock or thermal cycle is applied to the multilayer ceramic capacitor 1, the electrically conductive resin layer defines and functions as a buffer layer. Therefore, the electrically conductive resin layer reduces or prevents the occurrence of cracking in the multilayer ceramic capacitor 1.

Metals of the electrically conductive particles may be, for example, Ag, Cu, Ni, Sn, Bi or alloys including them. The electrically conductive particle preferably includes Ag, for example. The electrically conductive particle is a metal powder of Ag, for example. Ag is suitable as an electrode material because of its lowest resistivity among metals. In addition, since Ag is a noble metal, it is not likely to be oxidized, and weatherability thereof is high. Therefore, the metal powder of Ag is suitable as the electrically conductive particle.

Furthermore, the electrically conductive particle may be a metal powder coated on the surface of the metal powder with Ag. When using those coated with Ag on the surface of the metal powder, the metal powder is preferably Cu, Ni, Sn, Bi, or an alloy powder thereof, for example. In order to make the metal of the base material inexpensive while keeping the characteristics of Ag, it is preferable to use a metal powder coated with Ag.

Furthermore, the electrically conductive particle may be formed by, for example, subjecting Cu and Ni to an oxidation prevention treatment. Furthermore, the electrically conductive particle may be, for example, a metal powder coated with Sn, Ni, and Cu on the surface of the metal powder. When using those coated with Sn, Ni, and Cu on the surface of the metal powder, the metal powder is preferably Ag, Cu, Ni, Sn, Bi, or an alloy powder thereof, for example.

The shape of the electrically conductive particle is not particularly limited. For the electrically conductive particle, a spherical metal powder, a flat metal powder, or the like can be used. However, it is preferable to use a mixture of a spherical metal powder and a flat metal powder.

The electrically conductive particles included in the electrically conductive resin layer mainly maintain the conductivity of the electrically conductive resin layer. Specifically, by a plurality of electrically conductive particles being in contact with each other, an energization path is provided inside the electrically conductive resin layer.

The resin of the electrically conductive resin layer may include, for example, at least one of a variety of known thermosetting resins such as epoxy resin, phenolic resin, urethane resin, silicone resin, polyimide resin, or the like. Among those, epoxy resin is excellent in heat resistance, moisture resistance, adhesion, etc., and thus is one of the more preferable resins. Furthermore, it is preferable that the resin of the electrically conductive resin layer include a curing agent together with a thermosetting resin. When epoxy resin is used as a base resin, the curing agent for the epoxy resin may be various known compounds such as, for example, phenols, amines, acid anhydrides, imidazoles, active esters, or amide-imides.

The electrically conductive resin layer may include a plurality of layers. The thickest portion of the electrically conductive resin layer is preferably about 10 μm or more and about 150 μm or less, for example.

The first plated layer 60A and the second plated layer 60B may be provided directly on the multilayer body 10 without providing the first base electrode layer 50A and the second base electrode layer 50B. That is, the multilayer ceramic capacitor 1 may include the plated layer that is directly electrically connected to the first internal electrode layer 31 and the second internal electrode layer 32. In such a case, the plated layer may be provided after the catalyst is disposed on the surface of the multilayer body 10 as a pretreatment.

Also in this case, the plated layer preferably includes a plurality of layers. The lower plated layer and the upper plated layer preferably include, respectively, at least one metal selected from Cu, Ni, Sn, Pb, Au, Ag, Pd, Bi or Zn, for example, or an alloy including these metals, for example. It is more preferable that the lower plated layer is provided using Ni with solder barrier performance, for example. It is more preferable that the upper plated layer is provided using Sn or Au with favorable solder wettability, for example. For example, when the first internal electrode layer 31 and the second internal electrode layer 32 are provided using Ni, it is preferable that the lower plated layer is provided using Cu with a good bonding property with Ni. The upper plated layer may be provided as necessary. The external electrode 40 may include only the lower plated layer. The plated layer may include the upper plated layer as an outermost layer. Furthermore, another plated layer may be provided on the surface of the upper plated layer.

The thickness per layer of the plated layer without the base electrode layer is preferably about 2 μm or more and about 10 μm or less, for example. The plated layer preferably does not include glass. The metal ratio per unit volume of the plated layer is preferably about 998 by volume or more, for example.

When the plated layer is provided directly on the multilayer body 10, it is possible to reduce the thickness of the base electrode layer. Therefore, it is possible to reduce the dimension in the height direction T of the multilayer ceramic capacitor 1 by the amount obtained by reducing the thickness of the base electrode layer. As a result, it is possible to reduce the height of the multilayer ceramic capacitor 1. Alternatively, it is possible to increase the thickness of the dielectric layer 20 sandwiched between the first internal electrode layer 31 and the second internal electrode layer 32 by the amount corresponding to a reduction in the thickness of the base electrode layer. As a result, it is possible to improve the thickness of the element body. Thus, by providing the plated layer directly on the multilayer body 10, it is possible to improve the design freedom of the multilayer ceramic capacitor.

When the dimension in the length direction of the multilayer ceramic capacitor 1 including the multilayer body 10 and the external electrodes 40 is defined as the L dimension, the L dimension is preferably about 0.2 mm or more and about 6 mm or less, for example. Furthermore, when the dimension in the height direction of the multilayer ceramic capacitor 1 is defined as the T dimension, the T dimension is preferably about 0.05 mm or more and about 5 mm or less, for example. Furthermore, when the dimension in the width direction of the multilayer ceramic capacitor 1 is defined as the W dimension, the W dimension is preferably about 0.1 mm or more and about 5 mm or less, for example.

Here, the inventor of example embodiments of the present application has discovered from many investigations, experiments, and simulations, that it is desirable to establish the holes of the internal electrode layer in an appropriate state in order to improve the reliability of the multilayer ceramic capacitors, even in a case of forming thin dielectric layers sandwiched between a plurality of internal electrode layers. This will be described below.

Conventionally, in order to increase the reliability of multilayer ceramic capacitors, various techniques are used. For example, Japanese Unexamined Patent Application, Publication No. 2018-46086 discloses a multilayer ceramic capacitor including a multilayer body in which a plurality of dielectric layers and a plurality of internal electrode layers are alternately stacked, and a plurality of auxiliary electrodes. In the multilayer ceramic capacitor of Japanese Unexamined Patent Application Publication No. 2000-133545, providing a plurality of auxiliary electrodes improves the reliability of the article. However, since the multilayer ceramic capacitor of Japanese Unexamined Patent Application, Publication No. 2018-46086 includes a plurality of auxiliary electrodes, it is difficult to maintain the area of the capacitor active portion that generates capacitance. Therefore, it is difficult to improve the reliability, while reducing or preventing a decrease in capacitance.

In view of the above, the inventor of example embodiments of the present application has intensively studied configurations of internal electrode layers that can improve the reliability, while reducing or preventing a decrease in capacitance by providing thin dielectric layers. As a result, the inventor of example embodiments of the present application has discovered that the configuration of the present example embodiment makes it possible to reduce or prevent electric field concentration and improve the reliability at the time of voltage application, while reducing or preventing a decrease in capacitance by providing thin dielectric layers.

More specifically, the inventor of example embodiments of the present invention has discovered that the location where the holes in the internal electrode layer are present is burned as a starting point at the time of occurrence of electrical breakdown in the multilayer ceramic capacitor. Then, the inventor of example embodiments of the present application has discovered that it is possible to reduce or prevent electric field concentration at the time of voltage application, while reducing or preventing a decrease in capacitance by adjusting the size of the area equivalent diameter D99 described later of the plurality of holes of the internal electrode layer, even in a case of providing thin dielectric layers.

More specifically, the inventor of example embodiments of the present application has discovered that, when the area equivalent diameter at which the cumulative value in the cumulative distribution of the area equivalent diameters of the plurality of holes provided in the first internal electrode layers 31 and the second internal electrode layers 32 is, for example, about 99% is defined as the area equivalent diameter D99, and the thickness of each of the dielectric layers 20 sandwiched between the first internal electrode layer 31 and the second internal electrode layer 32 is defined as the thickness t, the following formula (1): (area equivalent diameter D99)<about $0.1468 \times \exp(6.7622 \times t)$ is satisfied, such that the inventor of example embodiments of the present invention has discovered that it is possible to reduce or prevent electric field concentration at the time of voltage application, even in a case of providing thin dielectric layers 20 each sandwiched between the plurality of internal electrode layers 30.

Hereinafter, the dielectric layers 20 and the internal electrode layers 30 of the present example embodiment will be described in detail.

Figure 5:
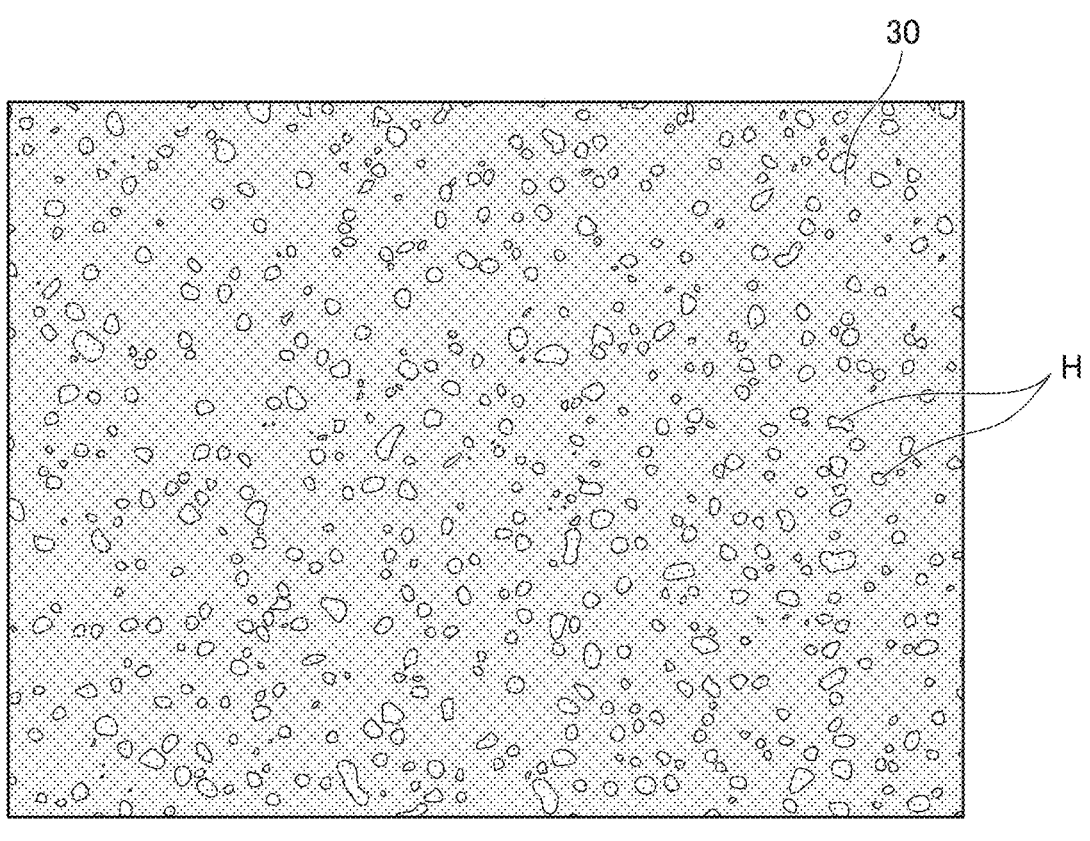
FIG. 5 is an enlarged view of a V portion of the multilayer ceramic capacitor 1 shown in FIG. 4A.

FIG. 5 is an enlarged view of the V portion of the multilayer ceramic capacitor 1 shown in FIG. 4A. FIG. 5 is a diagram exemplarily showing a state of the first internal electrode layer 31 as the internal electrode layer 30. More specifically, FIG. 5 is a view of the internal electrode layer 30 in the WT cross section of the multilayer ceramic capacitor 1 of the present preferred example embodiment, when viewed in the height direction T between the first main surface TS1 and the second main surface TS2, i.e., in a plan view. The coating state of the first internal electrode layer 31 with respect to the dielectric layer 20, and the coating state of the second internal electrode layer 32 with respect to the dielectric layer 20 when viewed in the height direction T between the first main surface TS1 and the second main surface TS2, are basically the same or substantially the same state. Therefore, in the following description, the first internal electrode layer 31 and the second internal electrode layer 32 are collectively described as the internal electrode layer 30 as necessary.

FIG. 5 is a diagram of the internal electrode layer 30 in the vicinity of the first side WE1 as a side of the internal electrode layer 30. As shown in FIG. 5, the internal electrode layer 30 includes a plurality of holes H having different shapes and different area equivalent diameters. The thickness of the internal electrode layer 30 shown in FIG. 5 is, for example, about 0.6 μm, and the coverage of the internal electrode layer with respect to the dielectric layer 20 is, for example, about 90%. The inside of each of the holes H of the internal electrode layer 30 may be a void, or a glass component such as a dielectric or silica may be provided therein, for example. When the inside of each of the holes H of the internal electrode layer 30 is a void, the dielectric layer 20 is visible through the hole H. The thickness of each of the dielectric layers 20 sandwiched between the two internal electrode layers 30 (the first internal electrode layer 31 and the second internal electrode layer 32) is about 0.5 μm, for example.

Figure 6:
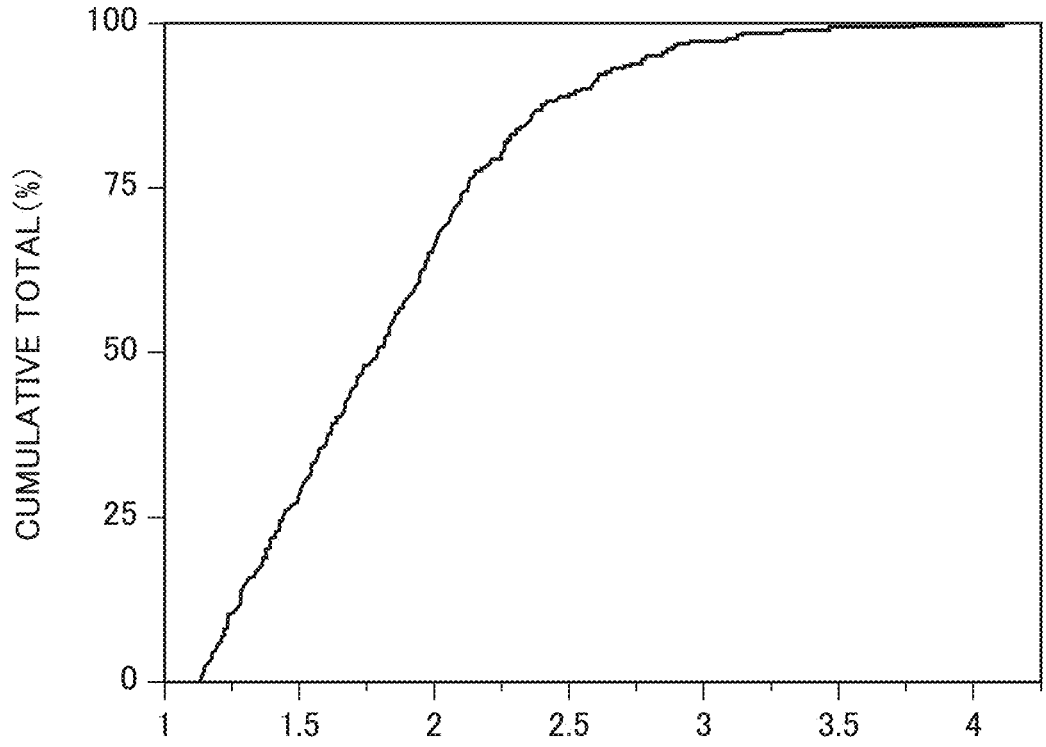
FIG. 6 is a diagram of area equivalent diameter distribution data of a plurality of holes in an internal electrode layer.

FIG. 6 is a diagram showing area equivalent diameter distribution data of the plurality of holes H existing in the internal electrode layer 30. FIG. 6 shows the cumulative percentage with respect to the area equivalent diameter. The horizontal axis of FIG. 6 represents the area equivalent diameters of the holes H. The vertical axis of FIG. 6 represents the cumulative percentage showing the value obtained by dividing the number of holes H below its area equivalent diameter (the cumulative value of the number of holes H) by the total number (the number of holes H of a population). That is, the area equivalent diameter distribution data shown in FIG. 6 refers to the area equivalent diameter distribution data of the number reference. The data in FIG. 6 is the area equivalent diameter distribution data in the measurement target region in the vicinity of the side of the internal electrode layer 30. In other words, the data of FIG. 6 is data when holes H existing in a region wider than the region shown in FIG. 5 are used as a population.

In the multilayer ceramic capacitor 1 of the present example embodiment, when the area equivalent diameter at which the cumulative value in the cumulative distribution of the area equivalent diameters of the plurality of holes H present in the first internal electrode layers 31 and the second internal electrode layers 32 is, for example, about 99% is defined as the area equivalent diameter D99, and the thickness of each of the dielectric layers 20 sandwiched between the first internal electrode layer 31 and the second internal electrode layer 32 is defined as the thickness t, the thickness t of each of the dielectric layers 20 is, for example, about 0.6 μm or less and the following formula (1): (area equivalent diameter D99)<about 0.1468×exp(6.7622×t) is satisfied (where the unit of the area equivalent diameter D99 and the unit of the thickness t of each of the dielectric layers 20 are expressed in the same or substantially the same manner, and are denoted by, for example, "μm").

In the example of the area equivalent diameter distribution data shown in FIG. 6, the area equivalent diameter D99 is about 3.6 μm. This is smaller than about 4.3 μm, which is a value obtained by assigning about 0.5 μm into the thickness t of the right side of Expression (1). That is, in the example in which the thickness t of each of the dielectric layers 20 is about 0.5 μm and the area equivalent diameter distribution data of the internal electrode layer 30 is the data shown in FIG. 6, the thickness t of each of the dielectric layers 20 is about 0.6 μm or less, and the formula (1) is satisfied. With such a configuration, it is possible to improve the reliability of the multilayer ceramic capacitor 1, even in a case of providing thin dielectric layers 20 each sandwiched by the plurality of internal electrode layers 30.

The area equivalent diameter refers to the value of the diameter of a perfect or substantially perfect circle with an area equal to the area of the hole H defined by the hole profile. For example, when the area of the hole H defined by the profile of the hole is about 50 μm², the area equivalent diameter is about 8.0 μm.

As described above, the area equivalent diameter D99 refers to the area equivalent diameter in which the cumulative value in the cumulative distribution of the area equivalent diameters of the plurality of holes H becomes about 99%. That is, a value such that the ratio of the holes H of the area equivalent diameters below this is about 99% is referred to as the area equivalent diameter D99.

Next, a description will be provided of how the above-described advantageous effects can be obtained using simulation.

Figure 7A:
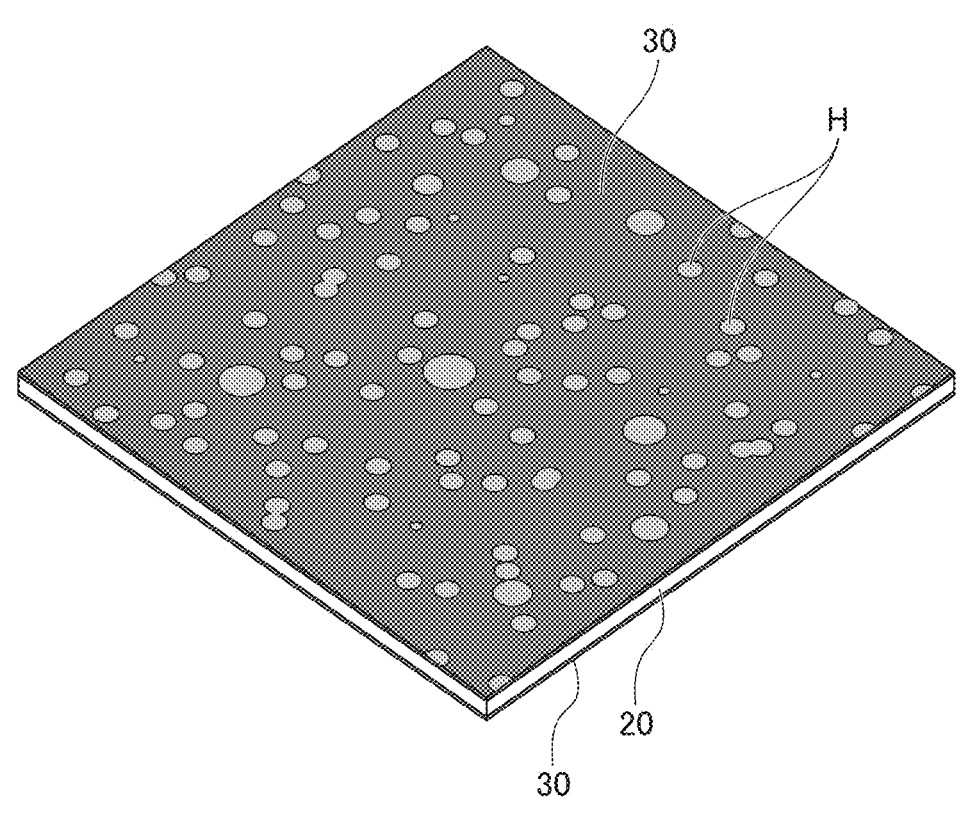
FIG. 7A is a diagram of a model of the internal electrode layer used in a simulation.

FIG. 7A is a model of the internal electrode layer 30 used in the simulation. In this model, the internal electrode layer 30 is provided on the dielectric layer 20. Furthermore, in this model, as shown in FIG. 7A, the plurality of holes H are provided randomly. Furthermore, the area equivalent diameters of the plurality of holes H include variations. In this model, the internal electrode layer 30 is provided in which a plurality of holes H are provided randomly also on the back surface side of the dielectric layer 20, similarly to the front surface side.

For example, in portable electronic devices such as smartphones, multilayer ceramic capacitors each having a high capacitance and a small size are required. In order to achieve high capacitance and a reduction in size, it is preferable to reduce the thickness of each of the dielectric layers 20 sandwiched between the two internal electrode layers 30 (the first internal electrode layer 31 and the second internal electrode layer 32). In this simulation, first, the thickness t of each of the dielectric layers 20 was set to about 0.5 μm.

In addition, for example, in multilayer ceramic capacitors for portable electronic devices, multilayer ceramic capacitors each having a relatively low rated voltage, for example, multilayer ceramic capacitors each having a rated voltage of about 6.3 V, are often used. Therefore, in this simulation, the applied voltage was about 6.3 V. In the simulation, a voltage is applied between the internal electrode layer 30 on the front surface side and the internal electrode layer 30 on the back surface side sandwiching the dielectric layer 20.

Further, in this simulation, the thickness of each of the internal electrode layers 30 was set to about 0.6 μm, and the coverage of the internal electrode layer 30 with respect to the dielectric layer 20 is set to about 88%. In this simulation, first, the plurality of holes H were set in the internal electrode layer 30 so that the area equivalent diameter D99 was about 2.0 μm.

Figure 7B:
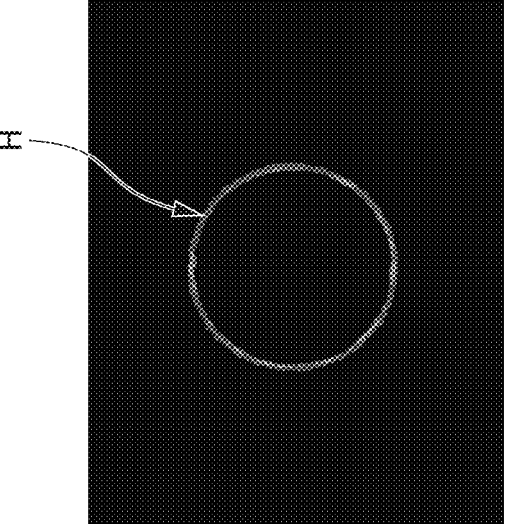
FIG. 7B is a diagram of an electric field strength distribution in the vicinity of the holes in the internal electrode layer.
Figure 7B:
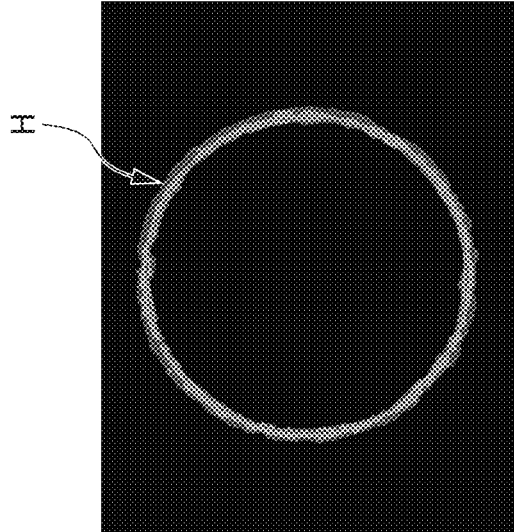

The simulation was performed under this setting condition, and it was confirmed that the electric field tends to concentrate around the profiles of the holes H. FIG. 7B is a diagram of an electric field strength distribution in the vicinity of the hole H. In FIG. 7B, the electric field strength is shown in gray scale, and the lighter color is shown for higher electric field strength. FIG. 7B shows that the electric field is concentrated around the hole H. It was also confirmed that the electric field tends to be concentrated around the profile of a relatively large hole H, such as that shown on the left side of FIG. 7B, rather than around the profile of a relatively small hole H, such as that shown on the right side of FIG. 7B.

Figure 8:
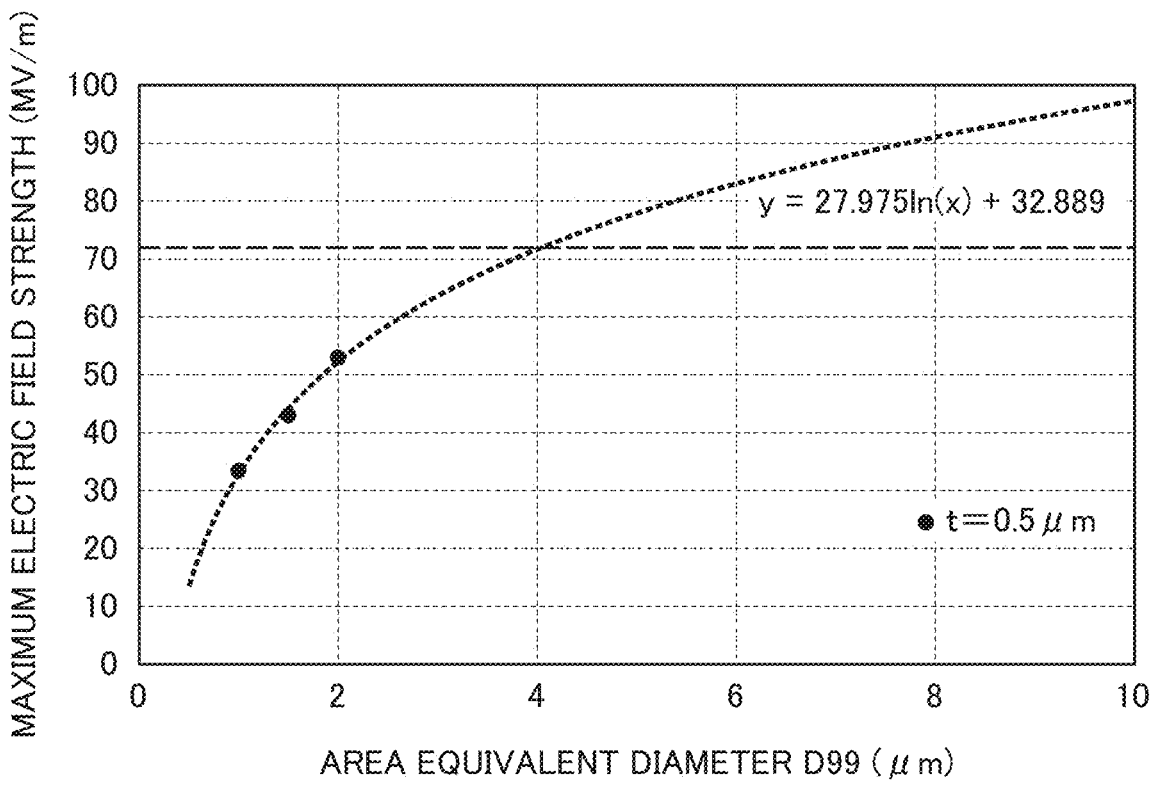
FIG. 8 is a graph of a maximum electric field strength in a model calculated for each simulation model in which the value of an area equivalent diameter D99 of a hole in the internal electrode layer varies.

Next, the electric field strength generated in each model was calculated using a model in which the value of the area equivalent diameter D99 is changed. Specifically, a model in which the area-equivalent diameter D99 was set to about 1.5 μm and a model in which the area-equivalent diameter D99 was set to about 1.0 μm are additionally prepared, and the electric field strength generated in the models were calculated. The thickness of each of the internal electrode layer 30, the coverage of the internal electrode layer 30 with respect to the dielectric layer 20, the thickness of each of the dielectric layer 20, and the applied voltage were set to constant values for simulation. FIG. 8 is a graph showing the results. The horizontal axis (x-axis) of FIG. 8 represents the value of the area equivalent diameter D99 in each of the models, and the vertical axis (y-axis) of FIG. 8 represents the maximum electric field strength in each of the models. FIG. 8 shows an approximate curve obtained by fitting the plotted points.

From FIG. 8, it was confirmed that the electric field concentration tends to be suppressed as the value of the area equivalent diameter D99 becomes smaller. From the approximate curve of FIG. 8, it was confirmed that, in a case in which the thickness t of each of the dielectric layers 20 is about 0.5 μm, when the area equivalent diameter D99 of the plurality of holes H present in the internal electrode layer 30 is less than about 4 μm, the value of the maximum electric field strength generated in the model is less than about 72 MV/m, and the electric field concentration is reduced or prevented. This value of the maximum electric field strength is acceptable to maintain the reliability of the multilayer ceramic capacitors.

Next, a simulation of calculating the electric field strength by changing the value of the thickness t of each of the dielectric layers 20 was performed. Specifically, for example, in cases where the thickness t of each of the dielectric layers 20 was about 0.4 μm and about 0.6 μm, the electric field strength in each of the models in which the area equivalent diameter D99 was set to about 2.0 μm, about 1.5 μm, and about 1.0 μm was calculated. In addition, for example, in a case where the thickness t of each of the dielectric layers 20 was about 0.4 μm, the electric field strength in each of the models in which the area equivalent diameter D99 was set to about 4.0 μm were calculated. The thickness of each of the internal electrode layers 30, the coverage of the internal electrode layer 30 with respect to the dielectric layer 20, the thickness of each of the dielectric layers 20, and the applied voltage were set to constant values for simulation.

Figure 9:
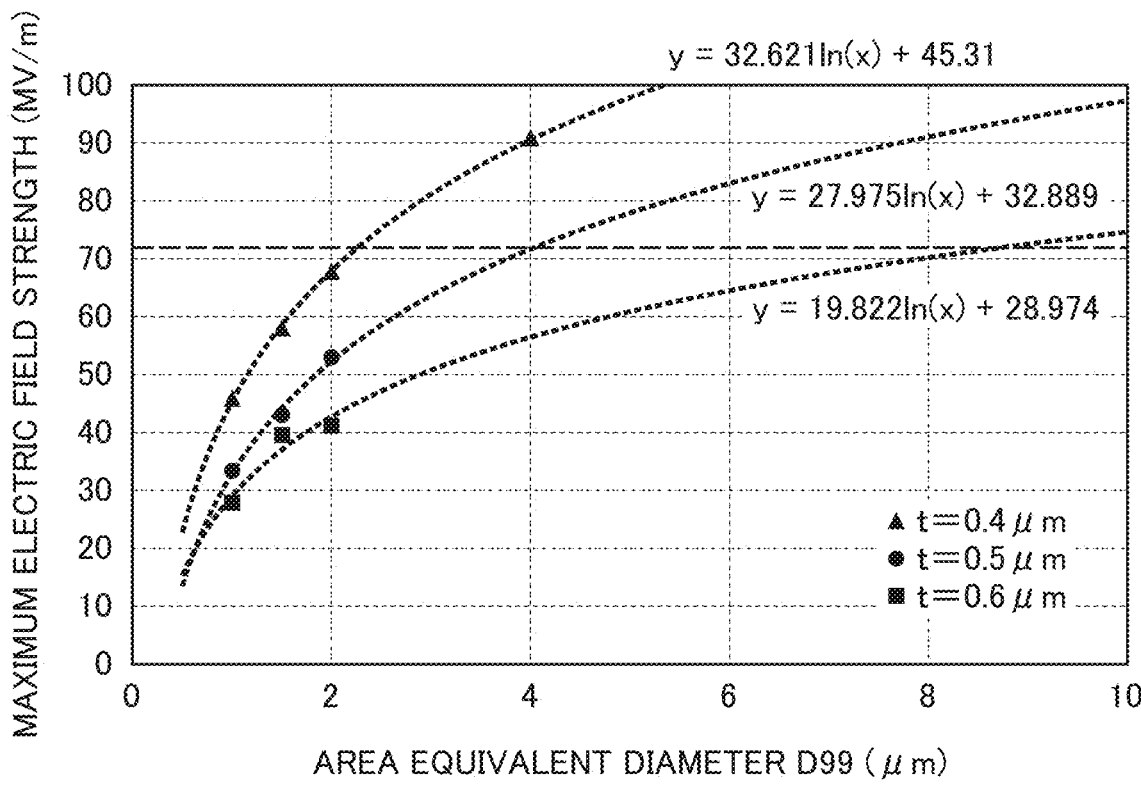
FIG. 9 is a graph of a maximum electric field strength in a model calculated in each simulation model in which the thickness of the dielectric layer and the value of the area equivalent diameter D99 of a hole in the internal electrode layer varies.

FIG. 9 is a graph showing the results. The horizontal axis (x-axis) of FIG. 9 represents the value of the area equivalent diameter D99 in each of the models, and the vertical axis (y-axis) of FIG. 9 represents the maximum electric field strength in each of the models. FIG. 9 shows an approximate curve obtained by fitting the plotted points.

As shown in FIG. 9, for example, also in a case where the thickness t of each of the dielectric layers 20 is about 0.4 μm and about 0.6 μm, it was confirmed that the electric field concentration tends to be reduced or prevented as the value of the area equivalent diameter D99 becomes smaller, as in a case of about 0.5 μm. Further, from the approximate curve of FIG. 9, it was confirmed that, in a case where the thickness t of each of the dielectric layers 20 was about 0.4 μm, when the area equivalent diameter D99 of each of the plurality of holes H present in the internal electrode layer 30 was lower than about 2 μm, the value of the maximum electric field strength generated in each of the models was lower than about 72 MV/m, and the electric field concentration was reduced or prevented. Further, in a case where the thickness t of each of the dielectric layers 20 was about 0.6 μm, it was confirmed that, when the area equivalent diameter D99 of each of the plurality of holes H present in the internal electrode layer 30 was lower than about 8.5 μm, the value of the maximum electric field strength generated in each of the models was lower than about 72 MV/m, and the electric field concentration was reduced or prevented.

Figure 10:
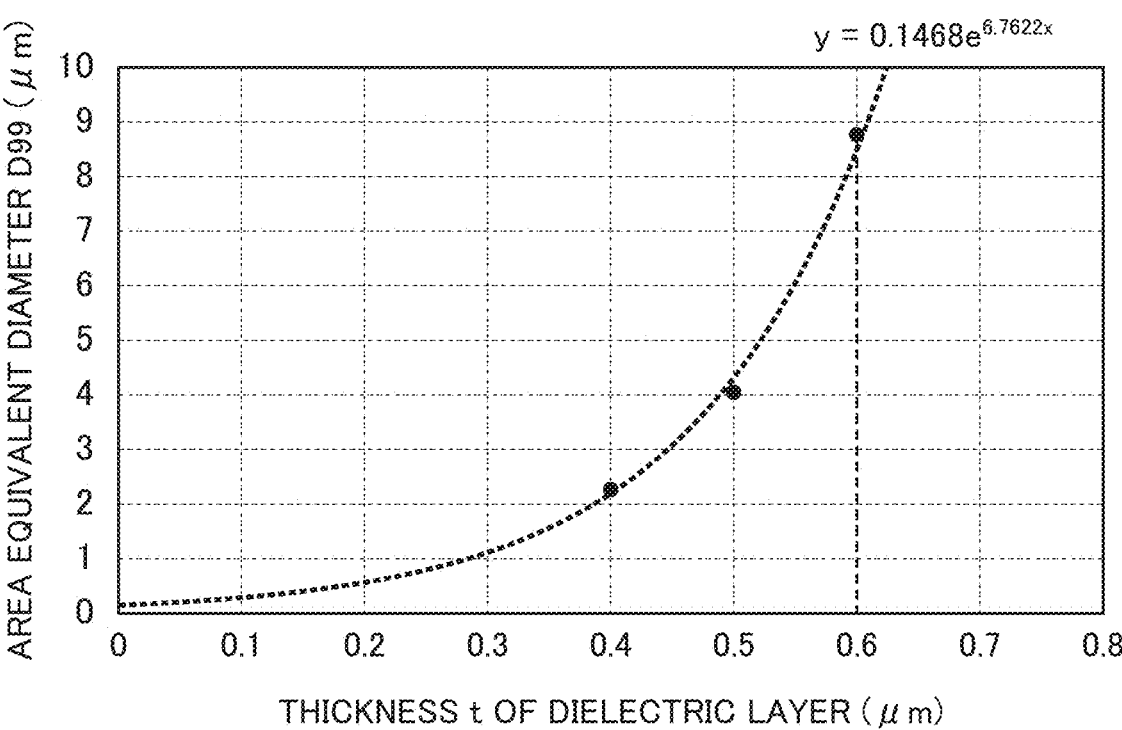
FIG. 10 is a graph for illustrating a region in which electric field concentration at the time of voltage application can be reduced or prevented.

Next, the area equivalent diameter D99 at which the value of the maximum electric field strength generated in each of the models was about 72 MV/m in cases of the thickness t of the dielectric layers 20 being about 0.4 μm, about 0.5 μm, and about 0.6 μm was calculated using each of the approximate curves shown in FIG. 9, and plotted in FIG. 10. The horizontal axis (x-axis) of FIG. 10 refers to the thickness t of each of the dielectric layers 20, and the vertical axis (y-axis) of FIG. 10 refers to the value of the area equivalent diameter D99. FIG. 10 shows an approximate curve obtained by fitting the plotted points.

In the multilayer ceramic capacitor 1 including the thin dielectric layers 20 each sandwiched between the plurality of internal electrode layers 30, by setting the area equivalent diameter D99 of each of the plurality of holes H present in the internal electrode layer 30 to a region below the approximate curve of FIG. 10, the reliability at the time of voltage application can be improved. That is, when the area equivalent diameter at which the cumulative value in the cumulative distribution of the area equivalent diameters of the plurality of holes H present in the first internal electrode layers 31 and the second internal electrode layers 32 is about 99% is defined as the area equivalent diameter D99, and the thickness of each of the dielectric layers 20 sandwiched between the first internal electrode layer 31 and the second internal electrode layer 32 is defined as the thickness t, the thickness t of each of the dielectric layers 20 is about 0.6 μm or less and the following formula (1): (area equivalent diameter D99)<about $0.1468 \times \exp(6.7622 \times t)$ is satisfied, such that it is possible to reduce or prevent electric field concentration at the time of voltage application, while reducing or preventing a decrease in capacitance by reducing the thickness t of each of the plurality of dielectric layers 20.

In addition, when the thickness t of each of the plurality of dielectric layers 20 is set to about 0.5 μm or less and the above-described expression (1) is satisfied, it is possible to reduce or prevent electric field concentration at the time of voltage application, while increasing the capacitance by reducing the thickness t of each of the plurality of dielectric layers 20. In addition, it is possible to reduce the thickness t of each of the plurality of dielectric layers 20 to reduce the size of the multilayer ceramic capacitor 1 and to reduce or prevent electric field concentration at the time of voltage application.

In addition, when the thickness t of each of the plurality of dielectric layers 20 is set to about 0.4 μm or less and the above-described expression (1) is satisfied, it is possible to reduce or prevent electric field concentration at the time of voltage application, while increasing the capacitance by further reducing the thickness t of each of the plurality of dielectric layers 20. In addition, it is possible to reduce the thickness t of each of the plurality of dielectric layers 20 to reduce the size of the multilayer ceramic capacitor 1 and to reduce or prevent electric field concentration at the time of voltage application.

Configurations are acceptable in which the thickness t of each of the plurality of dielectric layers 20 is, for example, about 0.2 μm or more such that the above formula (1) is satisfied. In this case, the area equivalent diameter D99 of each of the plurality of holes H present in the internal electrode layer 30 may be, for example, about 0.57 μm or more. The thickness t of each of the dielectric layers 20 may be, for example, about 0.3 μm or more. The thickness t of each of the dielectric layers 20 may be, for example, about 0.2 μm or more and about 0.6 μm or less. Alternatively, the thickness t of each of the dielectric layers 20 may be, for example, about 0.2 μm or more and about 0.5 μm or less. The thickness t of each of the dielectric layers 20 may be, for example, about 0.2 μm or more and about 0.4 μm or less.

In addition, in each of the models of the present simulation, even when the coverage, which is the coverage ratio of the internal electrode layer 30 with respect to the dielectric layer 20, is changed, the value of the maximum electric field strength hardly changes. For the purpose of maintaining the capacitance, it is preferable that the coverage is high. For example, even in a case where the coverage is about 70% or more and about 99% or less, by providing the configuration of the present example embodiment, it is possible to reduce or prevent electric field concentration at the time of voltage application while reducing or preventing a decrease in capacitance. In addition, for example, even in a case where the coverage is high, such as about 86% or more and about 93% or less, and the productivity is also in a favorable range, by providing the configuration of the present example embodiment, it is possible to reduce or prevent electric field concentration at the time of voltage application while reducing or preventing a decrease in capacitance. That is, in the present example embodiment, for example, the coverage which is the coverage ratio of the internal electrode layer 30 with respect to the dielectric layer 20 may be about 70% or more and about 99% or less, and may be about 86% or more and about 93% or less.

In each of the models of the present simulation, even when the thickness of each of the internal electrode layers 30 is changed, the value of the maximum electric field strength hardly changes. By reducing the thickness of each of the internal electrode layers 30, it is possible to increase the number of laminated layers even in a case of the multilayer body 10 having the same or substantially same size, and thus it is possible to maintain the capacitance. For example, even in a case where the thickness of each of the internal electrode layers 30 is about 0.2 μm or more and about 2.0 μm or less, by providing the configuration of the present example embodiment, it is possible to reduce or prevent electric field concentration at the time of voltage application while reducing or preventing a decrease in capacitance. In addition, for example, even in a case where the thickness of each of the internal electrode layers 30 is about 0.2 μm or more and about 0.6 μm or less, by providing the configuration of the present example embodiment, it is possible to reduce or prevent electric field concentration at the time of voltage application while reducing or preventing a decrease in capacitance. In addition, for example, even in a case where the thickness of each of the internal electrode layers 30 is about 0.2 μm or more and about 0.4 μm or less, by providing the configuration of the present example embodiment, it is possible to reduce or prevent electric field concentration at the time of voltage application while reducing or preventing a decrease in capacitance.

In addition, the thicknesses of each of the first internal electrode layers 31 and each of the second internal electrode layers 32 may be thicker than the thickness t of each of the dielectric layers 20 sandwiched between a corresponding one of the first internal electrode layer 31 and a corresponding one of the second internal electrode layer 32. This makes it easy to increase the coverage of the internal electrode layer 30 and reduce the area equivalent diameter D99 of each of the plurality of holes H present in the internal electrode layer 30. As a result, it is possible to improve the reliability of the product while reducing or preventing a decrease in capacitance.

In each of the models of the present simulation, even when the area equivalent diameter D99 of each of the plurality of holes H present in the internal electrode layer 30 is fixed and the average diameter is changed, the value of the maximum electric field strength hardly changes. Therefore, it can be recognized that the dependence of the average hole diameter on the maximum electric field strength is low, and the change in the state in the holes H each having a relatively large area equivalent diameter contributes more to the reduction of the maximum electric field strength.

The configuration of the present example embodiment can be suitably used for multilayer ceramic capacitors for portable electronic terminals, for example, multilayer ceramic capacitors used at a rated voltage of about 6.3 V or less. For example, in the multilayer ceramic capacitor 1 of the present example embodiment, the value of the maximum electric field strength when a rated voltage is applied between the first internal electrode layer 31 and the second internal electrode layer 32 sandwiching the dielectric layer 20 is preferably about 72 MV/m or less. The rated voltage is, for example, about 6.3 V. That is, in the multilayer ceramic capacitor 1 of the present example embodiment, the value of the maximum electric field strength when about 6.3 V is applied between the first internal electrode layer 31 and the second internal electrode layer 32 sandwiching the dielectric layer 20 is preferably about 72 MV/m or less. The multilayer ceramic capacitor 1 of the present example embodiment can also be practically used for multilayer ceramic capacitors each having a rated voltage of, for example, about 10 V or less. However, the application of the multilayer ceramic capacitor is not limited thereto.

Hereinafter, a non-limiting example of a method of measuring various parameters will be described. Various parameters can be confirmed by the following method.
Method of Measuring Thickness of Internal Electrode Layer and Dielectric Layer An example of a method of measuring the thicknesses of each of the dielectric layers 20 and each of the internal electrode layers 30 of the multilayer ceramic capacitor 1 will be described.

First, the lateral surface-side outer layer portion is scraped off by polishing from the first lateral surface WS1 or the second lateral surface WS2 to expose the internal electrode layers 30. Further, polishing is performed, for example, about 10 μm toward the center in the width direction W to expose the LT cross section in which the plurality of internal electrode layers 30 are exposed. If necessary, the cross section exposed at the observation position is etched to remove the internal electrode layers 30 stretched by polishing.

Figure 11:
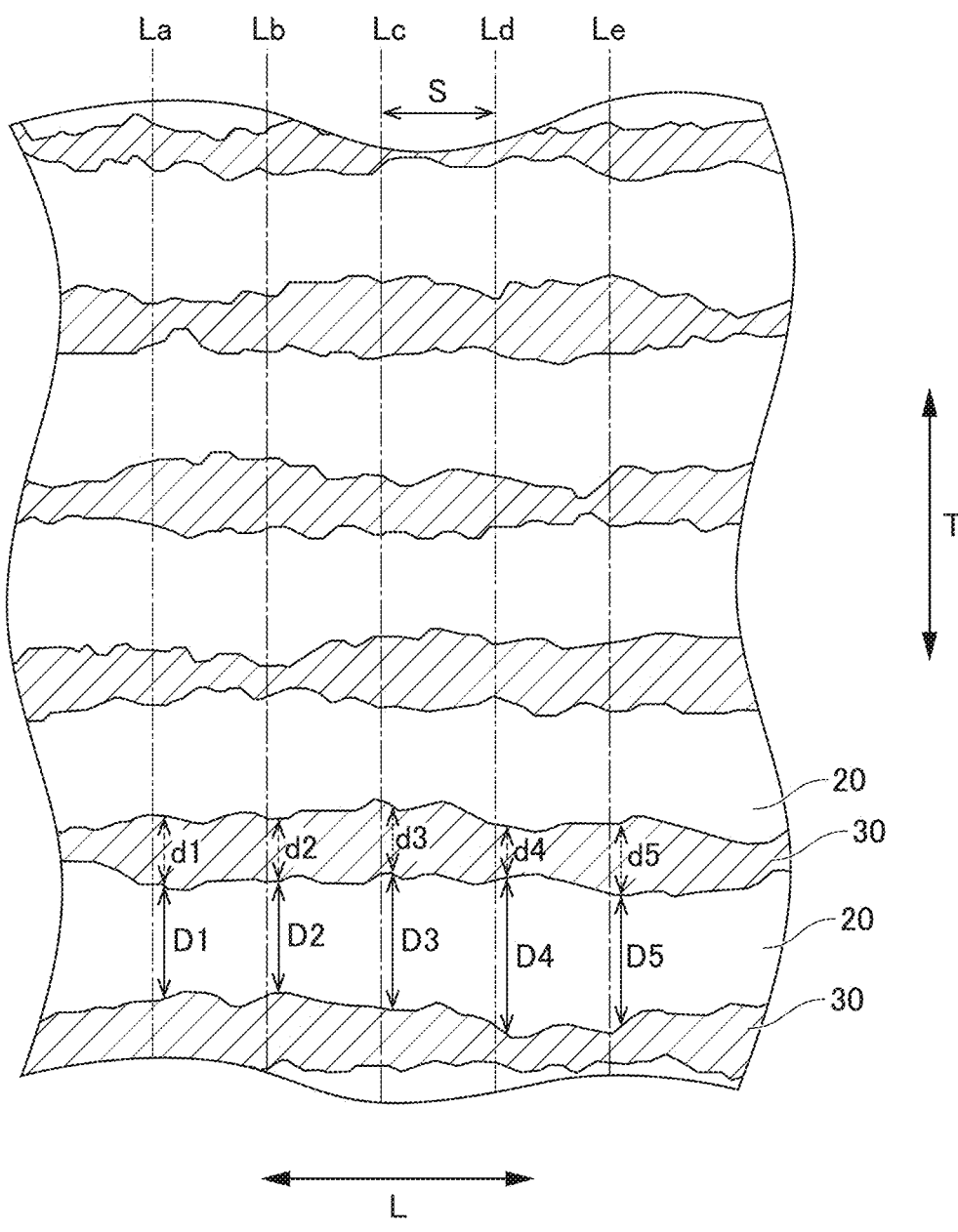
FIG. 11 is a view for explaining an example of a method of measuring thicknesses of internal electrode layers and dielectric layers, and is a view showing an example of an enlarged image obtained by observing a cross section of an exposed active layer portion in a multilayer ceramic capacitor with an SEM.

Three portions of the exposed cross section, i.e., an upper portion, a middle portion, and a lower portion in the lamination direction (height direction T) in the middle of the length direction L are observed with a scanning electron microscope (SEM). The observation magnification is a magnification at which five dielectric layers 20 and six internal electrode layers 30 can be observed, and the dielectric layers 20 and the internal electrode layers 30 can be clearly distinguished from each other. FIG. 11 is a view showing an example of an enlarged image of a cross section of the multilayer ceramic capacitor 1 observed by SEM.

When the thickness of each of the internal electrode layers 30 of the multilayer ceramic capacitor 1 is measured, as shown in FIG. 11, five straight lines La to Le extending in the lamination direction of the multilayer body 10 are drawn at equal intervals (pitch S) in an enlarged image of the cross section of the multilayer ceramic capacitor 1. The pitch S may be determined to be about 5 times to about 10 times the thickness of each of the internal electrode layers 30 to be measured, and for example, in a case of measuring each of the internal electrode layers 30 having a thickness of about 0.5 μm, the pitch S is set to about 2.5 μm. Next, the thickness of each of the internal electrode layers 30 is measured on each of the straight lines La to Le. However, when the internal electrode layer 30 is missing on each of the straight lines La to Le and the dielectric layers 20 sandwiching the internal electrode layer 30 are connected to each other, or when the enlarged image of the measurement position is unclear, a new straight line is drawn, and the thickness of each of the internal electrode layers 30 is measured.

For example, when the thickness of each of the internal electrode layers 30 is measured, as shown in FIG. 11, the thickness d1 on the straight line La, the thickness d2 on the straight line Lb, the thickness d3 on the straight line Lc, the thickness d4 on the straight line Ld, and the thickness d5 on the straight line Le are measured. Then, the thickness of each of the five internal electrode layers 30 is measured by the above-described method for each of the upper portion, the middle portion, and the lower portion of the cross section of the multilayer body 10, and the average value thereof is defined as the thickness of each of the internal electrode layers 30 of the present example embodiment.

The thickness of each of the dielectric layers 20 is also measured in the same or substantially the same manner as the internal electrode layer 30. When the thickness of each of the dielectric layers 20 is measured, as shown in FIG. 11, the thickness D1 on the straight line La, the thickness D2 on the straight line Lb, the thickness D3 on the straight line Lc, the thickness D4 on the straight line Ld, and the thickness D5 on the straight line Le are measured. Then, the thickness of each of the five dielectric layers 20 is measured by the above-described method for each of the upper portion, the middle portion, and the lower portion of the cross section of the multilayer body 10, and the average value thereof is defined as the thickness of each of the dielectric layers 20 of the present example embodiment.

Area-Equivalent Diameter D99

Next, a measurement target region when a parameter such as the area equivalent diameter D99 is measured will be described.

Here, the inventor of example embodiments of the present invention repeatedly conducted investigation, experiments, and simulations, and have obtained knowledge, in particular, that it is preferable to make the holes in a predetermined region of the internal electrode layer into an appropriate state in order to improve the reliability of multilayer ceramic electronic components such as the multilayer ceramic capacitors. More specifically, the inventor of example embodiments of the present invention repeatedly performed the analysis or the like after the accelerated life test of the multilayer ceramic capacitors, and have obtained knowledge that the burned position at the time of electrical breakdown of the multilayer body of the multilayer ceramic capacitor is often located in a region which is in the vicinity of the lateral surface-side outer layer portion and slightly away from the side (end portion) of the internal electrode layer, such that it is desirable to make the hole in this region an appropriate state.

Figure 12:
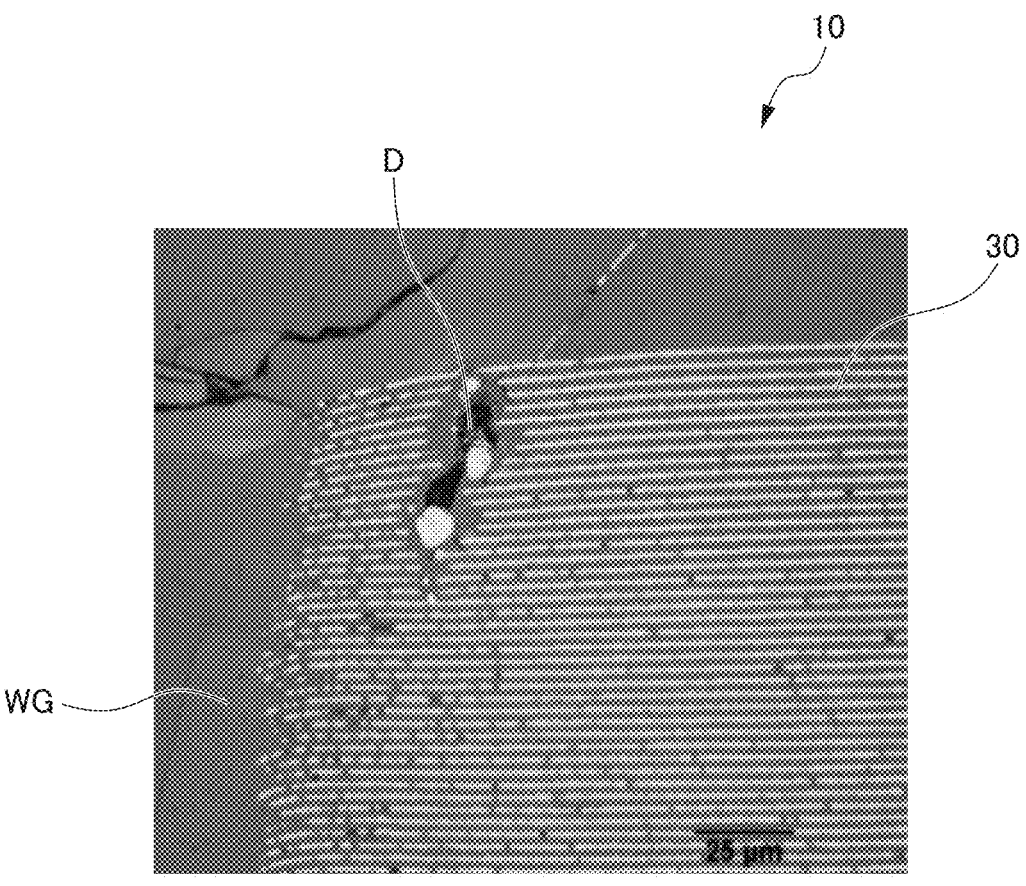
FIG. 12 is an SEM image corresponding to an enlarged view of a portion XII of the multilayer ceramic capacitor shown in FIG. 3, and is a diagram showing a burnout state of a multilayer body at the time of dielectric breakdown when an accelerated life test is performed.

FIG. 12 is an image of SEM corresponding to the enlarged view in the WT cross section of the XII portion of the multilayer ceramic capacitor 1 shown in FIG. 3, and is a diagram showing a burned state at the time of electrical breakdown of the multilayer body 10 when subjected to an accelerated life test. Thus, in the multilayer ceramic capacitor 1, a burned point D of the multilayer body 10 is likely to occur in a region which is in the vicinity of the lateral surface-side outer layer portion WG and slightly away from the side of the internal electrode layer 30.

Therefore, it is preferable to set the plurality of holes H of the internal electrode layer 30 in this region to an appropriate state. Furthermore, it is preferable that the above-described measurement target region is set in a region which is in the vicinity of the lateral surface-side outer layer portion WG and is slightly away from the side of the internal electrode layer 30.

More specifically, it is preferable to set a first region A1, a second region A2, a third region A3, and a fourth region A4 in the first internal electrode layer 31 and in the second internal electrode layer 32 as the measurement target regions. The first region A1 is defined as a region from a position about 10 μm away from the first side WE1 to a position about 50 μm away from the first side WE1. The second region A2 is defined as a region from a position about 10 μm away from the second side WE2 to a position about 50 μm away from the second side WE2. The third region A3 is defined as a region from a position about 10 μm away from the third side WE3 to a position about 50 μm away from the third side WE3. The fourth region A4 is defined as a region from a position about 10 μm away from the fourth side WE4 to a position about 50 μm away from the fourth side WE4. When the linearity of the first side WE1 to the fourth side WE4 is low, each side is defined as a straight line by linear fitting according to linear regression, such that the first region A1 to the fourth region A4 are defined, for example.

FIG. 4A schematically shows the first region A1 and the second region A2 as measuring target regions. FIG. 4B schematically shows the third region A3 and the fourth region A4 as the measuring target regions.

In the first region A1, the second region A2, the third region A3, and the fourth region A4 as the measurement target regions, a measurement target range for practically performing the measurement of the parameter based on the SEM observation is set.

In the SEM observation, the observation range in one observation field is set to about 40 μm×about 40 μm to about 80 μm×about 80 μm, for example. The analysis target range is set to a range of about 40 μm×about 40 μm, for example. Then, parameters such as an area equivalent diameter and the like are measured based on the set of 12 analysis target ranges.

More specifically, in each region of the first region A1, the second region A2, the third region A3 and the fourth region A4, the analysis target range a is set at three locations each. The analysis target ranges a of the three locations are set within the range of the counter electrode portion 11E. Among the three analysis target ranges a, the analysis target range a that is set closest to the first end surface LS1 is set to, for example, a position about 10 μm away from the first end surface-side outer layer portion LG1. Among the three analysis target ranges a, the analysis target range a that is set closest to the second end surface LS2 is set to, for example, a position about 10 μm away from the second end surface-side outer layer portion LG2. Among the three analysis target ranges a, the analysis target range a that is set at the middle position is set at the middle position in the length direction L of the multilayer body 10. The three analysis target ranges a are set at positions, each having an equal or substantially equal interval in the length direction L of the multilayer ceramic capacitor, for example. FIG. 4A shows, as an example, the analysis target ranges a at three locations set in the second region A2. Furthermore, a measurement target range in which a parameter such as the area equivalent diameter D99 is measured is set by a set of 12 analysis target ranges a in total of 4 regions×3 locations.

When the chip size of the multilayer ceramic capacitor 1 is small, the first region A1 to the fourth region A4 may be set to positions overlapping each other. Each analysis target range a may also be set to positions overlapping each other. In this case, the respective regions are set at different positions while being overlapped with each other, and the respective analysis target ranges are set so as to cover as large a region of the internal electrode layer 30 as possible.

Method of Measuring Area Equivalent Diameters D99

An example of a method of measuring the area equivalent diameters D99 of each of the holes existing in the internal electrode layer 30 will be described.

First, the internal electrode layer 30 is exposed by peeling the internal electrode layer 30 and the dielectric layer 20 located at the middle portion in the height direction of the multilayer body 10 by electric field peeling. Next, a portion of the first to fourth regions A1 to A4 as the measurement target regions of the internal electrode layer 30 is set as the above-described analysis target range a, and SEM observation is performed. When the first internal electrode layer 31 is exposed, first, portions of the first region A1 and the second region A2 of the first internal electrode layer 31 are set as the above-described analysis target ranges a, and SEM observation is performed. Thereafter, the second internal electrode layer 32 is exposed by the FIB (Focused Ion Beam) process. Furthermore, portions of the third region A3 and the fourth region A4 of the second internal electrode layer 32 are set as the above-described analysis target range a, and SEM observation is performed. After the SEM observation of the second internal electrode layer 32, the SEM observation of the first internal electrode layer 31 may be performed.

In the SEM observation, the SEM image is analyzed to identify the profiles of the individual holes H provided in the internal electrode layer 30. Thereafter, for each hole H provided in the internal electrode layer 30, the area equivalent diameter of the hole H is calculated based on the area of the hole H defined by the profile of the hole H. The area equivalent diameter (equivalent area diameter) refers to the value of the diameter of a perfect or substantially perfect circle with an area equal to the area of the hole H defined by the profile of the hole H.

The area equivalent diameters of the individual holes H are calculated for the twelve analysis target ranges a of the measurement target range.

The measurement target range, i.e., a set of all of the holes H identified in the analysis target ranges at 12 locations, is set as a population of holes H.

The area equivalent diameter D99 is calculated based on the data of the area equivalent diameters of the population of holes H in the measurement target range. The area equivalent diameter D99 is calculated as the area equivalent diameter in which the cumulative value in the cumulative distribution of the number basis of the area equivalent diameters of the plurality of holes H existing in the measurement target area is about 99%.

Method of Measuring Coverage

An example of a method for measuring the coverage as the coverage of the internal electrode layer 30 with respect to the dielectric layer 20 will be described.

First, the internal electrode layer 30 is exposed by peeling the internal electrode layer 30 and the dielectric layer 20 located at the middle portion in the height direction of the multilayer body 10 by electric field peeling. Next, a portion of the first to fourth regions A1 to A4 as the measurement target regions of the internal electrode layer 30 is set as the above-described analysis target range a, and SEM observation is performed. When the first internal electrode layer 31 is exposed, first, portions of the first region A1 and the second region A2 of the first internal electrode layer 31 are set as the above-described analysis target ranges a, and SEM observation is performed. Thereafter, the second internal electrode layer 32 is exposed by the FIB (Focused Ion Beam) process. Furthermore, portions of the third region A3 and the fourth region A4 of the second internal electrode layer 32 are set as the above-described analysis target range a, and SEM observation is performed. After the SEM observation of the second internal electrode layer 32, the SEM observation of the first internal electrode layer 31 may be performed.

Thereafter, by analyzing the SEM image, the region of the internal electrode layer 30 in the analysis target range a is identified. Thereafter, based on the area of the analysis target range a and the area of the region of the internal electrode layer 30, the coverage of the internal electrode layer 30 with respect to the dielectric layer 20 is calculated by the following expression (2).

$$\text{Coverage (\%)} = \qquad\qquad (2)$$

$$(\text{Area of internal electrode layer}/\text{Area of analysis target range}) \times 100$$

For the twelve analysis target ranges of the measurement target range, the coverage of the internal electrode layer 30 with respect to the dielectric layer 20 is calculated. Then, the average value is defined as the coverage of the internal electrode layer 30 with respect to the dielectric layer 20 of the present example embodiment of the present invention.

Next, an example of a method of manufacturing the multilayer ceramic capacitor 1 of the present example embodiment of the present invention will be described. The method of manufacturing the multilayer ceramic capacitor 1 of the present example embodiment is not limited to the above example as long as the above-described requirements are satisfied.

A dielectric sheet for manufacturing the dielectric layer 20 and an electrically conductive paste for manufacturing the internal electrode layer 30 are provided. The electrically conductive paste for the dielectric sheet and the internal electrode includes a binder and a solvent. Known binders and solvents may be used.

On the dielectric sheet, an electrically conductive paste for manufacturing the internal electrode layer 30 is printed in a predetermined pattern by, for example, screen printing or gravure printing. Thus, the dielectric sheet in which the pattern of the first internal electrode layer 31 is formed, and the dielectric sheet in which the pattern of the second internal electrode layer 32 is formed is prepared.

By a predetermined number of dielectric sheets in which the pattern of the internal electrode layer is not printed being laminated, a portion defining and functioning as the first main surface-side outer layer portion 12 in the vicinity of the first main surface TS1 is formed. On top of that, the dielectric sheets in which the pattern of the first internal electrode layer 31 is printed, and the dielectric sheets in which the pattern of the second internal electrode layer 32 is printed are sequentially laminated, such that a portion defining and functioning as the inner layer portion 11 is formed. On this portion defining and functioning as the inner layer portion 11, a predetermined number of dielectric sheets in which the pattern of the internal electrode layer is not printed are laminated, such that a portion defining and functioning as the second main surface-side outer layer portion 13 in the vicinity of the second main surface TS2 is formed. Thus, a multilayer sheet is produced.

The multilayer sheet is pressed in the height direction by means of hydrostatic pressing, for example, such that a laminated block is produced.

The multilayer block is cut to a predetermined size, such that multilayer chips are cut out. At this time, corner portions and ridge portions of the multilayer chip may be rounded by, for example, barrel polishing or the like.

The multilayer chip is fired to produce the multilayer body 10. The firing temperature depends on the materials of the dielectric layers 20 and the internal electrode layers 30, but is, for example, preferably about 900° C. or more and about 1400° C. or less.

Here, in order to set the area equivalent diameter D99 of each of the holes H existing in the internal electrode layer 30 to a predetermined value or less, and in order for the area equivalent diameter D99 of the holes existing in the internal electrode layer 30 to fall within a predetermined range, the above-described manufacturing conditions are adjusted.

More specifically, the pressure, the temperature, and the pressing time at the time of lamination of the dielectric sheet on which the pattern of the internal electrode layer 30 is printed, are adjusted, such that the area equivalent diameter D99 of the holes H existing in the internal electrode layer 30 is adjusted to be equal to or less than a predetermined value. For example, when the internal electrode layer 30 is relatively thin, the pressure at the time of pressing the multilayer sheet is set to be higher.

Furthermore, the material of the electrically conductive paste for the internal electrode layer 30 may be prepared in order to set the area equivalent diameter D99 of the holes H existing in the internal electrode layer 30 to a predetermined value or less. For example, when the main component of the internal electrode layer 30 is Ni, particles of larger average particle size are used as Ni particles as a raw material of the electrically conductive paste, such that the bonding start temperature between Ni particles and the sintering shrinkage start temperature of the ceramic can be brought closer together. As a result, the internal electrode layer 30 is restrained from balling, and the area equivalent diameter D99 is adjusted to be equal to or less than a predetermined value. Furthermore, when the same ceramic powder as the ceramic powder included in the dielectric layer 20 is added as a co-material to the electrically conductive paste for the internal electrode layer 30, the bonding initiation temperature between Ni particles and the sintering shrinkage initiation temperature of the ceramic can be brought closer together by using a co-material having a larger average particle diameter. As a result, the internal electrode layer 30 is restrained from balling, and the area equivalent diameter D99 is adjusted to be equal to or less than a predetermined value. Furthermore, by controlling the Ni particles of the electrically conductive paste for the internal electrode layer 30, the co-material, and the affinity between the solvents, the co-material dispersibility may be increased. As a result, the internal electrode layer 30 is restrained from balling, and the area equivalent diameter D99 of the holes H is adjusted to be equal to or less than a predetermined value.

Furthermore, the multilayer chips may be provided densely side by side during firing, such that the uniformity of the temperature in the chips during firing is improved. As a result, the internal electrode layer 30 is restrained from balling, and the area equivalent diameter D99 is adjusted to be equal to or less than a predetermined value. Furthermore, by firing the multilayer chips in a state embedded in the ceramic powder, the uniformity of the temperature inside and outside of the multilayer chips during firing may be improved. As a result, the internal electrode layer 30 is restrained from balling, and the area equivalent diameter D99 is adjusted to be equal to or less than a predetermined value. At the time of firing, the temperatures of portions in the vicinity of the first lateral surface and the second lateral surface of the multilayer chip, for example, the side in the vicinity of the first lateral surface WS1 and the side of the second lateral surface WS2 of the internal electrode layer 30, tend to rise. Therefore, the internal electrode layer 30 tends to be balled in these portions. However, according to the above-described method, balling is reduced or prevented in the first to fourth regions A1 to A4 of the internal electrode layer 30, such that the area equivalent diameter D99 of the holes H existing in the internal electrode layer 30 can be set to a predetermined value or less.

By forming the internal electrode layer 30 by two-stage printing, the internal electrode layer 30 may be provided such that the area equivalent diameter D99 of the holes H existing in at least the portions in the vicinity of the first lateral surface and the second lateral surface of the multilayer chip, for example, in the first region A1 to the fourth region A4 is equal to or smaller than a predetermined value. In this case, an electrically conductive paste including, for example, Ni particles having a large average particle size and a co-material having a large average particle size is printed on at least the first region A1 to the fourth region A4. Then, the electrically conductive paste including the Ni particles having a relatively small average particle size and the co-material having a relatively small average size is printed on the other regions including the central region of the internal electrode layer 30. As a result, the area equivalent diameter D99 of the holes H existing in at least the first to fourth regions A1 to A4 can be set to a predetermined value or less.

The above-described method of setting the area equivalent diameter D99 of the holes H existing in the internal electrode layer 30 to a predetermined value or less can be appropriately combined. Thus, the area equivalent diameter D99 of the holes H existing in the internal electrode layer 30 can be set to a predetermined value or less, or can be adjusted within a predetermined range. Similarly, by the above-described method, the area equivalent diameter D90 of the holes H existing in the internal electrode layer 30 can be adjusted to a predetermined value or less, or can be adjusted within a predetermined range.

The electrically conductive paste defining and functioning as a base electrode layer (the first base electrode layer 50A and the second base electrode layer 50B) is applied to both end surfaces of the multilayer body 10. In the present example embodiment, the base electrode layer is fired layers. An electrically conductive paste including a glass component and metal is applied to the multilayer body 10 by, for example, a method such as dipping. Thereafter, a firing process is performed to form the base electrode layer. The temperature of the firing process at this time is, for example, preferably about 700° C. or higher and about 900° C. or lower.

In a case in which the multilayer chip before firing and the electrically conductive paste applied to the multilayer chip are fired simultaneously, it is preferable that the fired layer is formed by firing a layer to which a ceramic material is added instead of a glass component. At this time, it is particularly preferable to use, as the ceramic material to be added, the same type of ceramic material as the dielectric layer 20. In this case, an electrically conductive paste is applied to the multilayer chip before firing, and the multilayer chip and the electrically conductive paste applied to the multilayer chip are fired simultaneously, such that the multilayer body 10 including a fired layer formed therein is formed.

Thereafter, the plated layer is formed on the surface of the base electrode layer. In the present example embodiment of the present invention, the first plated layer 60A is formed on the first base electrode layer 50A. The second plated layer 60B is formed on the second base electrode layer 50B. In the present example embodiment of the present invention, for example, the Ni plated layer and the Sn plated layer are formed as the plated layer. Upon performing the plating process, electrolytic plating or electroless plating may be used. However, the electroless plating has a disadvantage in that a pretreatment with a catalyst or the like is necessary in order to improve the plating deposition rate, and thus the process is complicated. Therefore, normally, electrolytic plating is preferably adopted. The Ni plated layer and Sn the plated layer are sequentially formed, for example, by barrel plating.

In a case in which the base electrode layer is formed with a thin film layer, such a thin film layer as the base electrode layer is formed at a portion where the external electrode is desired to be formed by performing masking or the like. The thin film layer is formed by a thin film forming method such as a sputtering method or a deposition method, for example. The thin film layer is a layer of, for example, about 1.0 µm or less on which metal particles are deposited.

When the electrically conductive resin layer is provided as the base electrode layer, the electrically conductive resin layer may cover the fired layer, or may be provided directly on the multilayer body 10 without providing the fired layer. When the electrically conductive resin layer is provided, an electrically conductive resin paste including a thermosetting resin and a metal component is applied onto the fired layer or the multilayer body 10, and then heat-treated at a temperature of, for example, about 250° C. to about 550° C. or higher. As a result, the thermosetting resin is thermally cured to form an electrically conductive resin layer. The atmosphere at the time of this heat treatment is, for example, preferably an N2 atmosphere. Furthermore, in order to prevent scattering of the resin and to prevent oxidation of various metal components, the oxygen concentration is, for example, preferably about 100 ppm or less.

The plated layer may be provided directly on the exposed portion of the internal electrode layer 30 of the multilayer body 10 without providing the base electrode layer. In this case, a plating process is performed on the first end surface LS1 and the second end surface LS2 of the multilayer body 10 such that a plated layer is provided on the exposed portion of the internal electrode layer 30. Upon performing the plating process, electrolytic plating or electroless plating may be used. However, the electroless plating has a disadvantage in that a pretreatment with a catalyst or the like is necessary in order to improve the plating deposition rate, and thus the process becomes complicated. Therefore, normally, electrolytic plating is preferably adopted. It is preferable to adopt barrel plating for the plating method. Furthermore, the upper plated layer provided on the surface of the lower plated layer may be provided as necessary by the same method as the lower plated layer.

By such a manufacturing process, the multilayer ceramic capacitor 1 is manufactured.

The multilayer ceramic capacitor 1 may be, for example, a two-terminal capacitor including two external electrodes, or may be a multi-terminal capacitor including a large number of external electrodes.

According to the multilayer ceramic capacitor 1 of the present example embodiment, the following advantageous effects are obtained.

(1) The multilayer ceramic capacitor 1 according to the present example embodiment includes the multilayer body 10 including the plurality of dielectric layers 20 that are laminated, the plurality of internal electrode layers 30 that are each laminated on a corresponding one of the plurality of dielectric layers 20, the first main surface TS1 and the second main surface TS2 opposed to each other in the height direction, the first lateral surface WS1 and the second lateral surface WS2 opposed to each other in the width direction orthogonal or substantially orthogonal to the height direction, and the first end surface LS1 and the second end surface LS2 opposed to each other in the length direction orthogonal or substantially orthogonal to the height direction and the width direction, and the first external electrode 40A and the second external electrode 40B. The plurality of internal electrode layers 30 include the plurality of first internal electrode layers 31 each electrically connected to the first external electrode 40A and the plurality of second internal electrode layers 32 each electrically connected to the second external electrode 40B. The plurality of first internal electrode layers 31 and the plurality of second internal electrode layers 32 each include the plurality of holes H having different area equivalent diameters. When an area equivalent diameter at which a cumulative value in a cumulative distribution of the area equivalent diameters of the plurality of holes H is about 99% is defined as the area equivalent diameter D99, and the thickness of each of the plurality of dielectric layers 20 sandwiched between a corresponding one of the plurality of first internal electrode layers 31 and a corresponding one of the plurality of second internal electrode layers 32 is defined as the thickness t, the thickness t of each of the plurality of dielectric layers 20 is 0.6 µm or less and the following formula (1): (area equivalent diameter D99)<about $0.1468 \times \exp(6.7622 \times t)$ is satisfied.

With such a configuration, it is possible to provide multilayer ceramic capacitors that are each able to reduce or prevent electric field concentration at the time of voltage application, while reducing or preventing a decrease in capacitance by providing the thin dielectric layers 20 each sandwiched between the plurality of internal electrode layers 30.

(2) In the multilayer ceramic capacitor 1 according to the present example embodiment, the thickness t of each of the plurality of dielectric layers 20 may be about 0.5 µm or less. With such a configuration, it is possible to provide multilayer ceramic capacitors that are each able to reduce or prevent electric field concentration at the time of voltage application, while reducing or preventing a decrease in capacitance.

(3) In the multilayer ceramic capacitor 1 according to the present example embodiment, the thickness t of each of the plurality of dielectric layers 20 may be about 0.4 μm or less. With such a configuration, it is possible to provide multilayer ceramic capacitors that are each able to reduce or prevent electric field concentration at the time of voltage application, while reducing or preventing a decrease in capacitance.

(4) In the multilayer ceramic capacitor 1 according to the present example embodiment, the thickness t of each of the plurality of dielectric layers 20 each sandwiched between the first internal electrode layer 31 and the second internal electrode layer 32 may be about 0.2 μm or more. With such a configuration, it is possible to reduce or prevent electric field concentration at the time of voltage application, while maintaining the thickness t of each of the plurality of dielectric layers 20.

(5) In the multilayer ceramic capacitor 1 according to the present example embodiment, the thickness t of each of the plurality of dielectric layers 20 each sandwiched between the first internal electrode layer 31 and the second internal electrode layer 32 may be about 0.3 μm or more. With such a configuration, it is possible to reduce or prevent electric field concentration at the time of voltage application, while maintaining the thickness t of each of the plurality of dielectric layers 20.

(6) In the multilayer ceramic capacitor 1 according to the present example embodiment, the area equivalent diameter D99 of each of the plurality of holes H present in the plurality of first internal electrode layers 31 and the plurality of second internal electrode layers 32 may be about 0.57 μm or more. In this case, about 0.57 μm is a value obtained by assigning about 0.2 μm as the thickness t of each of the plurality of dielectric layers 20 in the above formula (1).

(7) In the multilayer ceramic capacitor 1 according to the present example embodiment, the thicknesses of the first internal electrode layer 31 and the second internal electrode layer 32 are greater than the thickness t of each of the plurality of dielectric layers 20 each sandwiched between the first internal electrode layer 31 and the second internal electrode layer 32. This makes it easy to increase the coverage of the internal electrode layer 30 and reduce the area equivalent diameter D99 of each of the plurality of holes H present in the internal electrode layer 30. With such a configuration, it is possible to enhance the reliability of the product, while reducing or preventing a decrease in capacitance.

(8) In the multilayer ceramic capacitor 1 according to the present example embodiment, a coverage as a coverage ratio of the internal electrode layer 30 with respect to the dielectric layer 20 may be about 70% or more and about 99% or less. With such a configuration, it is possible to reduce or prevent electric field concentration at the time of voltage application, while reducing or preventing a decrease in capacitance.

(9) In the multilayer ceramic capacitor 1 according to the present example embodiment, a coverage as a coverage ratio of the internal electrode layer 30 with respect to the dielectric layer 20 may be about 86% or more and about 93% or less. With such a configuration, it is possible to reduce or prevent electric field concentration at the time of voltage application, while reducing or preventing a decrease in capacitance.

(10) In the multilayer ceramic capacitor 1 according to the present example embodiment of the present invention, the external electrodes 40 may include the first external electrode 40A in the vicinity of the first end surface LS1 and the second external electrode 40B in the vicinity of the second end surface LS2. The plurality of internal electrode layers 30 include the plurality of first internal electrode layers 31 which are electrically connected to the first external electrode 40A, and the plurality of second internal electrode layers 32 which are electrically connected to the second external electrode 40B. The first internal electrode layers 31 each include the first side WE1 in the vicinity of the first lateral surface WS1 and the second side WE2 in the vicinity of the second lateral surface WS2. The second internal electrode layers 32 each include the third side WE3 in the vicinity of the first lateral surface WS1 and the fourth side WE4 in the vicinity of the second lateral surface WS2. In the first internal electrode layers 31, the first region A1 is defined as a region from a position about 10 μm away from the first side WE1 to a position about 50 μm away from the first side WE1, the second region A2 is defined as a region from a position about 10 μm away from the second side WE2 to a position about 50 μm away from the second side WE2, the third region A3 is defined as a region from a position about 10 μm away from the third side WE3 to a position about 50 μm away from the third side WE3, the fourth region A4 is defined as a region from a position about 10 μm away from the fourth side WE4 to a position about 50 μm away from the fourth side WE4. When the holes H existing in the first region A1, the second region A2, the third region A3, and the fourth region A4 are defined as a population of the holes H, the area equivalent diameter D99 is an area equivalent diameter in which a cumulative value in a cumulative distribution of the area equivalent diameters of the holes H in the population of the holes H becomes about 99%. With such a configuration, it is possible to provide multilayer ceramic capacitors with high reliability that reduce or prevent the electric field concentration.

(11) The multilayer ceramic capacitor 1 according to the present example embodiment of the present invention includes the multilayer body 10 including the plurality of dielectric layers 20 that are laminated, the plurality of internal electrode layers 30 each laminated on a corresponding one of the plurality of dielectric layers 20, the first main surface TS1 and the second main surface TS2 opposed to each other in the height direction, the first lateral surface WS1 and the second lateral surface WS2 opposed to each other in the width direction orthogonal or substantially orthogonal to the height direction, and the first end surface LS1 and the second end surface LS2 opposed to each other in the length direction orthogonal or substantially orthogonal to the height direction and the width direction, and the external electrodes 40 each connected to the plurality of internal electrode layers 30. The plurality of internal electrode layers 30 each include a plurality of holes each having a different area equivalent diameter.

The external electrodes 40 include the first external electrode 40A in the vicinity of the first end surface LS1 and the second external electrode 40B in the vicinity of the second end surface LS2. The plurality of internal electrode layers 30 include the plurality of first internal electrode layers 31 which are electrically connected to the first external electrode 40A, and the plurality of second internal electrode layers 32 which are electrically connected to the second external electrode 40B. The first internal electrode layers 31 each include the first side WE1 in the vicinity of the first lateral surface WS1 and the second side WE2 in the vicinity of the second lateral surface WS2. The second internal electrode layers 32 each include the third side WE3 in the vicinity of the first lateral surface WS1 and the fourth side WE4 in the vicinity of the second lateral surface WS2. In the first internal electrode layers 31, the first region A1 is defined as a region from a position about 10 μm away from the first side WE1 to a position about 50 μm away from the first side WE1, the second region A2 is defined as a region from a position about 10 μm away from the second side WE2 to a position about 50 μm away from the second side WE2, the third region A3 is defined as a region from a position about 10 μm away from the third side WE3 to a position about 50 μm away from the third side WE3, the fourth region A4 is defined as a region from a position about 10 μm away from the fourth side WE4 to a position about 50 μm away from the fourth side WE4. When the holes H existing in the first region A1, the second region A2, the third region A3, and the fourth region A4 are defined as a population of the holes H, and when an area equivalent diameter at which a cumulative value in a cumulative distribution of the area equivalent diameters of the plurality of holes H in the population of the holes H is about 99% is defined as an area equivalent diameter D99 and a thickness of each of the plurality of dielectric layers 20 sandwiched between a corresponding one of the plurality of first internal electrode layers 31 and a corresponding one of the plurality of second internal electrode layers 32 is defined as the thickness t, the thickness t of each of the plurality of dielectric layers 20 is about 0.6 μm or less and the following formula (1): (area equivalent diameter D99)<about 0.1468× exp(6.7622×t) is satisfied. With such a configuration, it is possible to provide multilayer ceramic electronic components with high reliability that reduce or prevent electric field concentration.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a multilayer body including a plurality of dielectric layers that are laminated, a plurality of internal electrode layers each laminated on a corresponding one of the plurality of dielectric layers, a first main surface and a second main surface opposed to each other in a height direction, a first lateral surface and a second lateral surface opposed to each other in a width direction orthogonal or substantially orthogonal to the height direction, and a first end surface and a second end surface opposed to each other in a length direction orthogonal or substantially orthogonal to the height direction and the width direction; and
a first external electrode and a second external electrode; wherein
the plurality of internal electrodes include a plurality of first internal electrodes each electrically connected to the first external electrode and a plurality of second internal electrode layers each electrically connected to the second external electrode;
the plurality of first internal electrode layers and the plurality of second internal electrode layers each include a plurality of holes with different area equivalent diameters;
when an area equivalent diameter at which a cumulative value in a cumulative distribution of the area equivalent diameters of the plurality of holes is about 99% is defined as an area equivalent diameter D99, and a thickness of each of the plurality of dielectric layers sandwiched between a corresponding one of the plurality of first internal electrode layers and a corresponding one of the plurality of second internal electrode layers is defined as a thickness t, the thickness t of each of the plurality of dielectric layers is about 0.6 μm or less and (area equivalent diameter D99)<about 0.1468× exp(6.7622×t) is satisfied.

2. The multilayer ceramic capacitor according to claim 1, wherein the thickness t of each of the plurality of dielectric layers is about 0.5 μm or less.

3. The multilayer ceramic capacitor according to claim 2, wherein the thickness t of each of the plurality of dielectric layers is about 0.4 μm or less.

4. The multilayer ceramic capacitor according to claim 1, wherein the multilayer body has a dimension in the length direction of about 0.2 mm or more and about 6 mm or less, a dimension in the height direction of about 0.05 or more and about 5 mm or less, and a dimension in the width direction of about 0.1 mm or more and about 5 mm or less.

5. The multilayer ceramic capacitor according to claim 1, wherein each of the plurality of dielectric layers includes $BaTiO_3$, $CaTiO_3$, $SrTiO_3$, or $CaZrO_3$ as a main component.

6. The multilayer ceramic capacitor according to claim 5, wherein each of the plurality of dielectric layers include a Mn compound, an Fe compound, a Cr compound, a Co compound, or a Ni compound as a secondary component.

7. The multilayer ceramic capacitor according to claim 1, wherein a number of the plurality of dielectric layers is 15 or more and 1200 or less.

8. The multilayer ceramic capacitor according to claim 1, wherein each of the plurality of internal electrode layers includes Ni, Cu, Ag, Pd, or Au, or an alloy including at least one of Ni, Cu, Ag, Pd, or Au.

9. The multilayer ceramic capacitor according to claim 1, wherein a thickness of each of the plurality of internal electrode layers is about 0.2 μm or more and 2.0 μm or less.

10. The multilayer ceramic capacitor according to claim 1, wherein a number of the plurality of internal electrode layers is 15 or more and 1000 or less.

11. The multilayer ceramic capacitor according to claim 1, wherein
the first external electrode includes a first base electrode layer and a first plated layer; and
the second external electrode includes a second base electrode layer and a second plated layer.

12. The multilayer ceramic capacitor according to claim 11, wherein the first and second base electrode layers are fired layers.

13. The multilayer ceramic capacitor according to claim 12, wherein each of the fired layers includes a metal component and at least one of a glass component and a ceramic component.

14. The multilayer ceramic capacitor according to claim 13, wherein the metal component includes at least one of Cu, Ni, Ag, Pd, Ag—Pd alloys, or Au.

15. The multilayer ceramic capacitor according to claim 13, wherein the glass component includes at least one of B, Si, Ba, Mg, Al, or Li.

16. The multilayer ceramic capacitor according to claim 13, wherein the ceramic component includes at least one of $BaTiO_3$, $CaTiO_3$, $(Ba, Ca)TiO_3$, $SrTiO_3$, or $CaZrO_3$.

* * * * *